US012700370B2

(12) United States Patent
Park et al.

(10) Patent No.: US 12,700,370 B2
(45) Date of Patent: Aug. 4, 2026

(54) LEVEL SHIFTER FOR SIMULTANEOUS RESET AND SENSING LINE SELECTION, DISPLAY APPARATUS INCLUDING THE SAME, AND DRIVING METHOD THEREOF

(71) Applicant: LG Display Co., Ltd., Seoul (KR)

(72) Inventors: Mingyu Park, Paju-si (KR); Jungjae Kim, Paju-si (KR); Jaewon Han, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/978,423

(22) Filed: Dec. 12, 2024

(65) Prior Publication Data

US 2025/0259601 A1 Aug. 14, 2025

(30) Foreign Application Priority Data

Feb. 13, 2024 (KR) ........................ 10-2024-0020319

(51) Int. Cl.

*G09G 3/3266* (2016.01)
*G09G 3/36* (2006.01)
*G09G 3/3233* (2016.01)

(52) U.S. Cl.

CPC ......... *G09G 3/3266* (2013.01); *G09G 3/3677* (2013.01); *G09G 3/3233* (2013.01); *G09G 2230/00* (2013.01); *G09G 2300/0871* (2013.01); *G09G 2310/0267* (2013.01); *G09G 2310/0289* (2013.01); *G09G 2310/061* (2013.01); *G09G 2310/08* (2013.01)

(58) Field of Classification Search

CPC ............... G09G 3/3266; G09G 3/3233; G09G 2300/0871; G09G 2310/08; G09G 3/3677; G09G 2230/00; G09G 2310/0267; G09G 2310/0289; G09G 2310/061

See application file for complete search history.

(56) References Cited

U.S. PATENT DOCUMENTS

2019/0197964 A1* 6/2019 Cho .................... G09G 3/3275

FOREIGN PATENT DOCUMENTS

| | | | | |
|---|---|---|---|---|
| KR | 20170068073 A | * | 6/2017 | G09G 3/20 |
| KR | 20180078909 A | * | 7/2018 | G09G 3/3233 |
| KR | 20200032586 A | * | 3/2020 | G09G 3/3266 |

* cited by examiner

*Primary Examiner* — Adam J Snyder

(74) *Attorney, Agent, or Firm* — Seed Intellectual Property Law Group LLP

(57) ABSTRACT

Embodiments relate to a level shifter including a first circuit unit configured to output a start signal, a reset signal, and a node charge signal to a gate driver in response to a start control signal and a node charge control signal that are input from a timing controller, a second circuit unit configured to output an output erase signal and a clock shift stop signal in response to the start signal and the reset signal, and a third circuit unit configured to generate a clock signal based on a clock control signal input from the timing controller and output the generated clock signal to the gate driver in response to the output erase signal and the clock shift stop signal that are output from the second circuit unit, a display device including the same, and a method of driving the display device.

18 Claims, 12 Drawing Sheets

LEVEL SHIFTER FOR SIMULTANEOUS RESET AND SENSING LINE SELECTION, DISPLAY APPARATUS INCLUDING THE SAME, AND DRIVING METHOD THEREOF

CROSS REFERENCE TO RELATED APPLICATION

The present application claims priority to Korean Patent Application No. 10-2024-0020319, filed Feb. 13, 2024, the entire contents of which is incorporated herein for all purposes by this reference.

BACKGROUND

Technical Field

The present disclosure relates to a level shifter, a display device including the same, and a method of driving the display device.

Description of the Related Art

As the information society develops, various demands for display devices for displaying images are increasing, and various types of display devices such as liquid crystal display (LCD) devices and organic light emitting diode (OLED) display devices are utilized.

Driving transistors provided in pixels of the display device have characteristic values, such as a threshold voltage and mobility, and the characteristic values may be changed when a pixel is degraded as a driving time increases. To compensate changes in characteristic values, a compensation method of compensating data to be applied to pixels based on sensing values after sensing characteristics values of the pixels by driving the display device may be applied.

As the resolution of the display device has increased, the number of pixels has increased, and the time required for compensation increases.

BRIEF SUMMARY

The disclosure is directed to a level shifter that increases a pixel sensing period by simultaneously performing the reset of a gate driver and selection of a sensing pixel line. Embodiments are directed to providing a display device and a method of driving the same, which simultaneously perform selection of a sensing pixel line while a gate driver is reset.

The embodiments are also directed to providing a level shifter for outputting an output removal signal in synchronization with a turn-on period of a reset signal and outputting a clock shift stop signal in synchronization with a falling edge of a reset signal and a rising edge of a start signal, a display device including the same, and a method of driving the display device.

A level shifter according to one embodiment may include a first circuit unit configured to output a start signal, a reset signal, and a node charge signal to a gate driver in response to a start control signal and a node charge control signal that are input from a timing controller, a second circuit unit configured to output an output erase signal and a clock shift stop signal in response to the start signal and the reset signal, and a third circuit unit configured to generate a clock signal based on a clock control signal input from the timing controller and output the generated clock signal to the gate driver in response to the output erase signal and the clock shift stop signal that are output from the second circuit unit.

The first circuit unit may output the start signal and the node charge signal at turn-on levels when receiving the start control signal and the node charge control signal at turn-on levels and output the reset signal at a turn-on level when receiving the reset signal and the node charge control signal at the turn-on levels.

The first circuit unit may include a logic gate, which receives the start control signal and an inverted signal of the node charge control signal and when the start control signal the inverted signal of the node charge control signal are both at the turn-on levels, outputs the reset signal at the turn-on level.

The second circuit unit may output the output erase signal at a turn-on level in response to the reset signal at the turn-on level output from the first circuit unit.

The second circuit unit may output the clock shift stop signal to rise in synchronization with a falling edge of the reset signal and fall in synchronization with a rising edge of the start signal.

The second circuit unit may include a digital logic gate which outputs the clock shift stop signal at a turn-on level when receiving the reset signal at a turn-on level and outputs the clock shift stop signal at a turn-off level when receiving the start signal at a turn-on level.

The second circuit unit may acquire a pulse counting number from the clock control signal applied from the timing controller while receiving the reset signal at a turn-on level and select a pixel line to be sensed based on the pulse counting number.

The third circuit unit may stop the output of the clock signal when receiving the output erase signal at a turn-on level, generate the clock signal having a phase corresponding to the selected pixel line when receiving the clock shift stop signal at a turn-on level, and output the clock signal to the gate driver.

A display device according to one embodiment may include a display panel on which pixels are disposed, a gate driver configured to provide a gate signal to the pixels, a timing controller configured to control an operating timing of the gate driver, and a level shifter configured to provide a clock signal to the gate driver based on a clock control signal input from the timing controller.

While the level shifter outputs a reset signal at a turn-on level to the gate driver during a blank time within one frame, the timing controller may apply the clock control signal to the level shifter.

The level shifter may apply the reset signal at a turn-on level to the gate driver to initialize the gate driver.

While the reset signal at a turn-on level is output, a pixel line of which characteristic values are sensed may be selected based on the clock control signal output from the timing controller.

While the level shifter outputs the reset signal at a turn-off level for the blank time, the gate driver may provide the gate signal to the selected pixel line based on the clock signal provided from the level shifter.

The level shifter may include a first circuit unit configured to output a start signal, a reset signal, and a node charge signal to a gate driver in response to a start control signal and a node charge control signal that are input from a timing controller, a second circuit unit configured to output an output erase signal and a clock shift stop signal in response to the start signal and the reset signal, and a third circuit unit configured to generate a clock signal based on a clock control signal input from the timing controller and output the generated clock signal to the gate driver in response to the output erase signal and the clock shift stop signal that are output from the second circuit unit.

The first circuit unit may output the start signal and the node charge signal at turn-on levels when receiving the start control signal and the node charge control signal at turn-on levels and output the reset signal at a turn-on level when receiving the reset signal and the node charge control signal at the turn-on levels.

The second circuit unit may output the output erase signal at a turn-on level in response to the reset signal at the turn-on level output from the first circuit unit.

The second circuit unit may output the clock shift stop signal to rise in synchronization with a falling edge of the reset signal and fall in synchronization with a rising edge of the start signal.

The second circuit unit may acquire a pulse counting number from the clock control signal applied from the timing controller while receiving the reset signal at a turn-on level and select a pixel line to be sensed based on the pulse counting number.

The third circuit unit may stop the output of the clock signal when receiving the output erase signal at a turn-on level, generate the clock signal having a phase corresponding to the selected pixel line when receiving the clock shift stop signal at a turn-on level, and output the clock signal to the gate driver.

A method of driving a display device including a gate driver configured to provide a gate signal to pixels, a timing controller configured to control an operation of the gate driver, and a level shifter configured to provide a clock signal to the gate driver based on a clock control signal input from the timing control unit according to one embodiment may include a reset and line selection operation of initializing the gate driver in response to a reset signal provided from the level shifter to the gate driver and selecting a pixel line to be sensed based on the clock control signal applied to the level shifter from the timing controller for a blank time within one frame, and a sensing operation of applying, by the gate driver, the gate signal to the selected pixel line based on the clock signal provided from the level shifter to the gate driver.

The reset and line selection operation may include applying, by the timing controller, a start control signal at a turn-on level to the level shifter, outputting, by the level shifter, a reset signal at a turn-on level to the gate driver in response to the start control signal, outputting, by the timing controller, the clock control signal to the level shifter while outputting the reset signal at the turn-on level, and counting, by the level shifter, the clock control signal and selecting the pixel line to be sensed.

DETAILED DESCRIPTION

Figure 1:
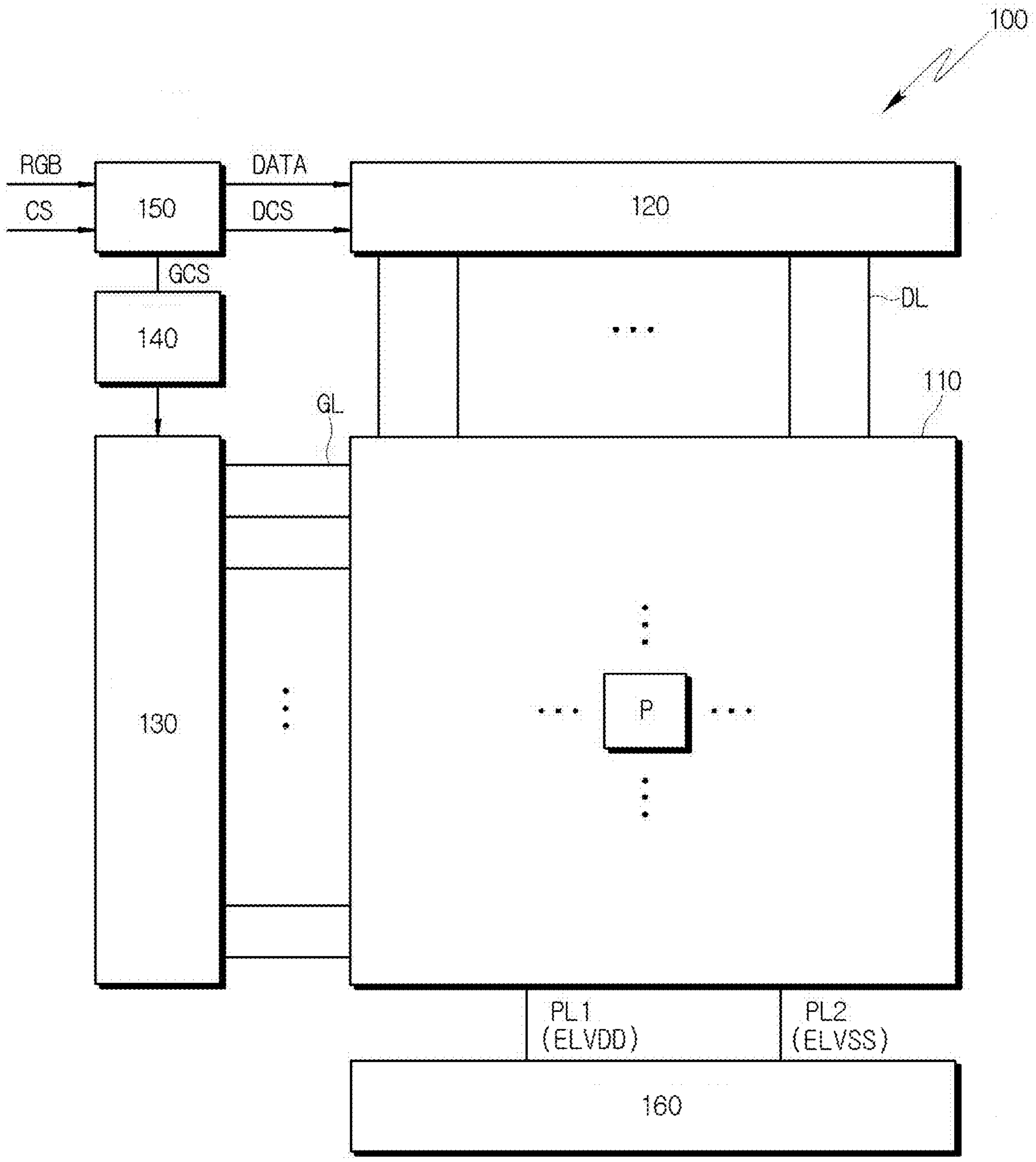
FIG. 1 is a block diagram schematically showing a structure of a display device according to one embodiment.

Hereinafter, embodiments will be described with reference to the accompanying drawings. In the specification, when a first component (or an area, a layer, a portion, or the like) is described as “on,” “connected,” or “coupled to” a second component, it means that the first component may be directly connected/coupled to the second component or a third component may be disposed therebetween.

The same reference numerals indicate the same components. In addition, in the drawings, thicknesses, proportions, and dimensions of components are exaggerated for effective description of technical contents. The term “and/or” includes all one or more combinations that may be defined by the associated configurations.

Terms such as first and second may be used to describe various components, but the components are not limited by the terms. The terms are used only for the purpose of distinguishing one component from another. For example, a first component may be referred to as a second component, and similarly, the second component may also be referred to as the first component without departing from the scopes of the embodiments. The singular expression includes the plural expression unless the context clearly dictates otherwise.

Terms such as “under,” “at a lower side,” “above,” and “at an upper side” are used to describe the relationship between the components illustrated in the drawings. The terms are relative concepts and are described with respect to directions marked in the drawings.

It should be understood that term such as “includes” or “has” is intended to specify the presence of features, numbers, steps, operations, components, parts, or a combination thereof described in the specification and does not preclude the presence or addition possibility of one or more other features, numbers, steps, operations, components, parts, or combinations thereof in advance. When a signal is described, a turn-on level or a turn-off level of each signal may be different from those of other signals. Further, a turn-on level of a signal does not necessarily mean a logic high level and a turn-off level of a signal does not necessarily mean a logic low level. The descriptions herein are not limited to any specific implementations of the signal designs with respect to the turn-on level or the turn-off level.

FIG. 1 is a block diagram schematically showing a structure of a display device according to one embodiment.

Referring to FIG. 1, a display device 100 according to one embodiment may include a display panel 110 and a driving unit for driving the display panel 110. The driving unit may include a data driver 120, a gate driver 130, a level shifter 140, a power supply unit 160, etc., and further include a timing controller 150 for controlling the data driver 120 and the gate driver 130.

The display panel 110 includes data lines DL, gate lines GL that intersect the data lines DL, and an array of pixels defined in an intersection areas of the data lines DL and the gate lines GL.

Each pixel PX may include transistors connected to the corresponding data line DL and gate line GL, a storage capacitor, and a light emitting element connected to the data lines DL, the gate lines GL, and the storage capacitor. Each pixel PX may emit light in response to the amount of current flowing through the light emitting element under the control of transistors.

The timing controller 150 may perform overall control functions related to driving the display panel 110 and control the operation timings of the data driver 120 and the gate driver 130. The timing controller 150 receives an image signal RGB and a timing signal CS transmitted from an external system (not shown) and generates a data control signal DCS and a gate control signal GCS. The timing signal CS may include a data enable signal, a horizontal synchronization signal, a vertical synchronization signal, a clock signal, etc. The gate control signal GCS may include, for example, a start control signal, a clock shift stop control signal, a node charging control signal, clock control signals (e.g., a carry clock control signal and a gate clock control signal), etc.

The data control signal DCS is output to the data driver 120, and the gate control signal GCS is output to the level shifter 140. The timing controller 150 generates digital image data DATA from the image signal transmitted from the external system and outputs the digital image data DATA to the data driver 120.

The data driver 120 converts the digital image data DATAn into an analog data voltage according to the data control signal DCS. The data driver 120 may apply the analog data voltage to the corresponding pixels P through the data line DL. In one embodiment, a multiplexer (not shown) may be disposed between the data driver 120 and the data lines DL. The multiplexer may distribute the data voltage input from the data driver 120 to the data lines DL under the control of the timing controller 150.

The level shifter 140 may provide a start signal, a reset signal, a node charge signal, clock signals (e.g., a carry clock signal and a gate clock signal), etc., to the gate driver 130 based on the gate control signal GCS input from the timing controller 150.

The gate driver 130 may sequentially output gate signals by one horizontal period through the gate line GL in response to signals input from the level shifter 140. A pixel row connected to each gate line GL may be turned on by one horizontal period in response to the gate signal.

The power supply unit 160 may convert a voltage input from the outside into a high potential driving voltage ELVDD and a low potential driving voltage ELVSS that are standard powers used inside the display device 100 and supply the high potential driving voltage ELVDD and the low potential driving voltage ELVSS to the display panel 110 through power lines PL1 and PL2.

The display device 100 according to one embodiment may be a display device including a backlight unit such as an LCD device and may be a self-luminous display device, such as an OLED display device, a quantum dot display device, and a micro LED display device.

When the display device 100 is the OLED display device, each pixel PX may include an OLED that emits light by themselves as the light emitting element. When the display device 100 is the quantum dot display device, each pixel PX may include a light emitting element formed of quantum dots that are semiconductor crystals that emit light by themselves. When the display device 100 is the micro LED display device, each pixel PX may include micro LEDs, which emit light by themselves and are made of an inorganic material, as a light emitting element. When the display device 100 is a nano LED display device, each pixel PX may include nano LEDs, which emit light by themselves and are made of inorganic material, as a light emitting element.

In one embodiment, each pixel PX may include a sensing circuit for sensing characteristic values of circuit elements in the pixel PX. The timing controller 150 may sense the characteristic values of each pixel PX using a sensing circuit in the pixel PX and compensate the image data DATA based on the sensed characteristic values. In one embodiment, sensing may be performed on a per-pixel line basis. For example, the timing controller 150 may select a pixel line to be sensed and transmit information about the selected pixel line to the level shifter 140 together with the gate control signal GCS. The level shifter 140 may generate the carry clock signal and the gate clock signal that correspond to the gate control signal GCS and output the carry clock signal and the gate clock signal to the gate driver 130. The gate driver 130 may provide the gate signal to the pixels P disposed in the selected pixel line in response to the carry clock signal and the gate clock signal. While the gate signal is provided, the characteristic values of the pixels P disposed in the corresponding pixel line may be sensed.

Figure 2:
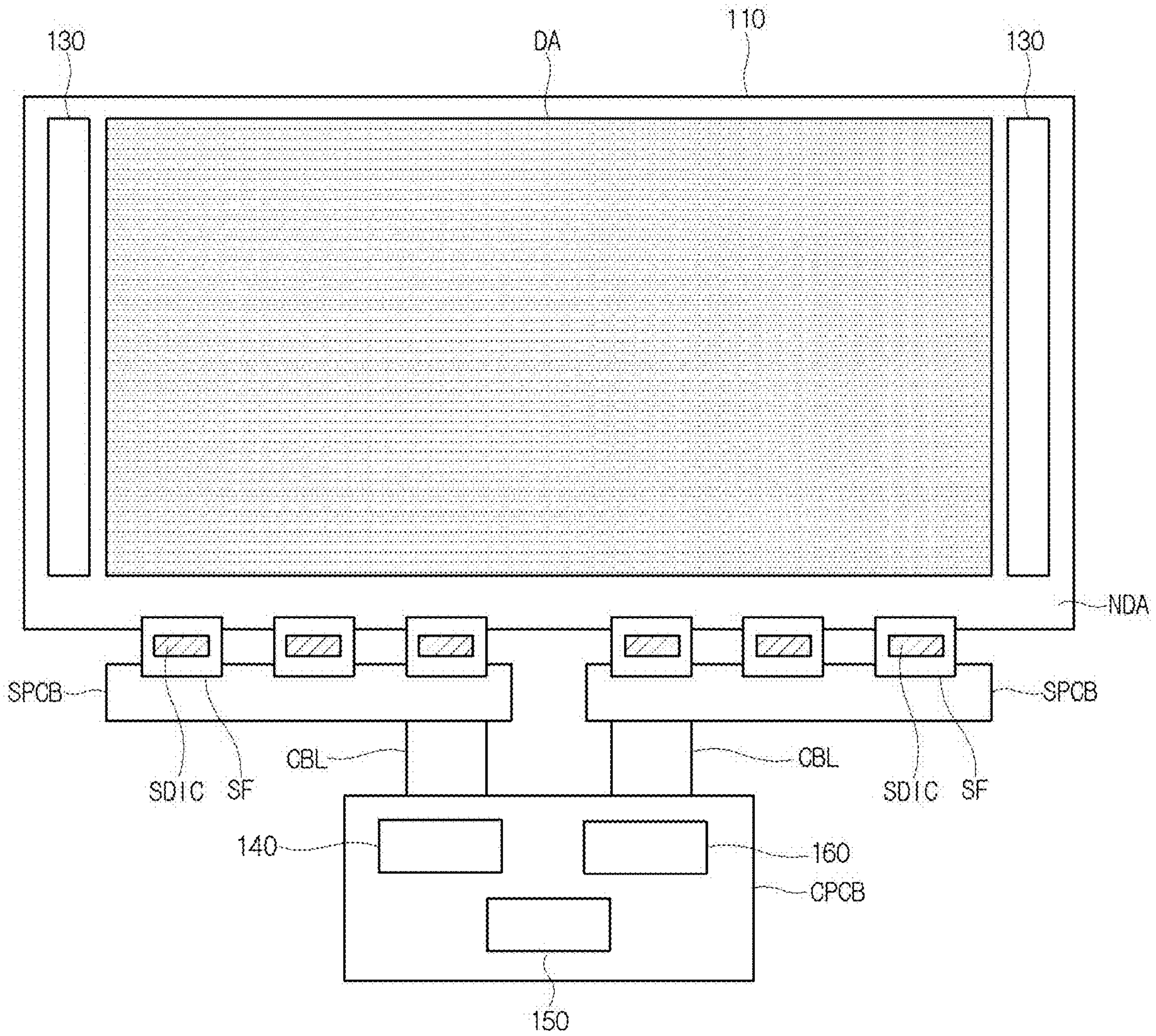
FIG. 2 is a schematic plan view of a display device according to a first embodiment.

FIG. 2 is a schematic plan view of a display device according to a first embodiment.

Referring to FIG. 2, the display panel 110 may include a display area DAn in which images are displayed and a non-display area NDAn in which the images are not displayed near the display area DA.

The display panel DAn includes the data lines DL (see FIG. 1), the gate lines GL (see FIG. 1) that intersect the data lines DL, and the array of pixels (see FIG. 1) defined in the intersection areas of the data lines DL and the gate lines GL.

At least some of the drivers may be mounted on or connected to the non-display area NDA. For example, the data driver 120 (see FIG. 1) may be connected to one side of the non-display area NDA, and the gate driver 130 may be mounted on one side or both sides of the non-display area NDA as shown.

The data driver 120 may be composed of one or more source driver integrated circuits SDIC. The source driver integrated circuit SDIC may include a shift register, a latch circuit, a digital-to-analog converter, an output buffer, etc. The source driver integrated circuit SDIC may further include an analog-to-digital converter.

For example, the source driver integrated circuit SDIC may be connected to the display panel 110 in a tape automated bonding (TAB) type, connected to a bonding pad of the display panel 110 in a chip on glass (COG) type or a chip on panel (GOP) type, or connected to the display panel 110 in a chip on film (COF) type. In this case, the driver integrated circuit may be mounted on a circuit film connected to the non-display area NDA of the display panel 110.

The source driver integrated circuit SDIC may be connected to one side (e.g., an upper or lower side) of the display panel 110 as shown. According to a driving method, a panel design method, etc., the data driver 120 may be connected to both sides (e.g., upper and lower sides) of the display panel 110 or connected to two or more of four side surfaces of the display panel 110.

The gate driver 130 may be composed of stage circuits connected one-to-one to the plurality of gate lines GL. The gate driver 130 may be configured in a gate in panel type mounted on the non-display area NDA of the display panel 110.

The gate driver 130 may be disposed at one side of the display panel 110 or both sides (e.g., left and right sides) of the display panel 110 as shown. According to a driving method, a panel design method, etc., the gate driver 130 may be disposed at two sides (e.g., left and right sides) of the display panel 110 as shown or connected to two or more of four side surfaces of the display panel 110.

The display device 100 may include a source printed circuit board SPCB for circuitry connection between the plurality of source driving integrated circuits SDIC and other devices, and a control printed circuit board CPCB on which control components and various electrical components are mounted.

The source printed circuit board SPCB may be connected to the display panel 110 through the circuit film SF. In other words, the circuit film SF may have one side connected to the non-display area NA of the display panel 110 and the other side connected to the source printed circuit board SPCB.

One or more source driver integrated circuits SDIC constituting the data driver 120 may be mounted on the source printed circuit board SPCB. In the present embodiment, each source driver integrated circuit SDIC may be implemented in the COF type.

The level shifter 140, the timing controller 150, the power supply unit 160, etc., may be mounted on the control printed circuit board CPCB. Various circuits or electronic components, such as the level shifter 140, the timing controller 150, the power supply unit 160, an integrated circuit (IC), a field programmable gate array (FPGA), an application specific integrated circuit (ASIC), or a processor.

The source printed circuit board SPCB and the control printed circuit board CPCB may be electrically connected through connection cables CBL. Here, the connection cable CBL may be, for example, a flexible printed circuit (FPC), a flexible flat cable (FFC), etc.

The at least one source printed circuit board SPCB and the control printed circuit board CPCB may be implemented integrally as one printed circuit board.

Figure 3:
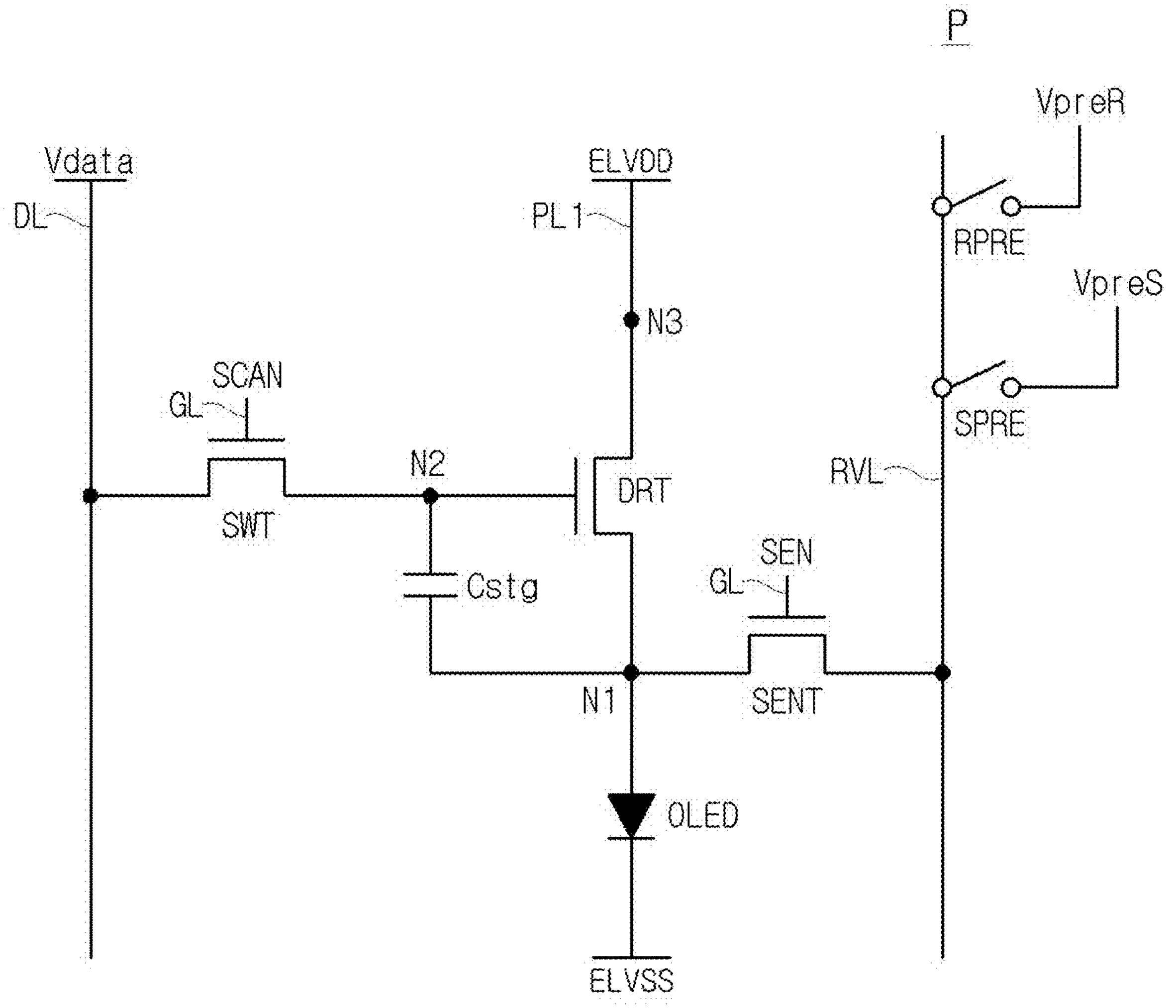
FIG. 3 is a circuit diagram of a pixel according to an embodiment.

FIG. 3 is a circuit diagram of a pixel according to one embodiment.

Referring to FIG. 3, the pixel PX may include the OLED and circuit elements for driving the OLED. The circuit elements may include, for example, a driving transistor DRT, a sensing transistor SENT electrically connected between a first node N1 of the driving transistor DRT and a read out line RVL, and a switching transistor SWT electrically connected between a second node N2 of the driving transistor DRT and the data line DL that supplies the data voltage Vdata. The circuit element may further include a storage capacitor Cstg electrically connected between the first node N1 and the second node N2 of the driving transistor DRT.

The OLED may include a first electrode (e.g., an anode), an organic layer, and a second electrode (e.g., a cathode).

The driving transistor DRT supplies a driving current to the OLED to emit the OLED. One electrode of the driving transistor DRT is electrically connected to the first electrode of the OLED through the first node N1. A gate electrode of the driving transistor DRT is electrically connected to the switching transistor SWT through the second node N2. The other electrode of the driving transistor DRT is electrically connected to the first power line PL1 through which the high potential driving voltage EVLDD is supplied through the third node N3.

The sensing transistor SENT is turned on by a sensing signal SEN to apply a reference voltage VpreR or VpreS to the first node N1. When turned on, the sensing transistor SENT may provide a sensing path to the first node N1 of the driving transistor DRT.

The switching transistor SWT is turned on by the gate signal SCAN to transmit the data voltage Vdata supplied through the data line DL to the gate electrode of the driving transistor DRT. The sensing transistor SENT and the switching transistor SWT may be connected to different gate lines GL and controlled to be turned on or off separately or connected to the same gate line GL and controlled.

The storage capacitor Cstg may be electrically connected between the first node N1 and the second node N2 to maintain the data voltage Vdata corresponding to the image signal voltage or a voltage corresponding to the image signal voltage for one frame.

As a driving time of the pixel PX increases, circuit elements such as the OLED and the driving transistor DRT may be degraded. Therefore, the unique characteristics (threshold voltage, mobility, etc.) of the circuit elements such as the OLED and the driving transistor DRT may be changed. Changes in characteristics of the circuit elements cause a change in luminance of the corresponding pixel PX, and a difference in the changes in characteristics between the circuit elements due to a difference in the degree of degradation between the circuit elements may cause a luminance deviation between the pixels P.

Therefore, the pixel PX may provide a sensing function of sensing changes in the characteristics of the pixel PX or a characteristic deviation between the pixels P. To implement such a function, the pixel PX may further include a driving reference voltage switch RPRE for controlling the supply of the driving reference voltage VpreR to the read out line RVL, and a sensing reference voltage switch SPRE for controlling the supply of the sensing reference voltage VpreS to the read out line RVL.

The driving reference voltage switch RPRE is turned on in a state in which the sensing transistor SENT is turned on by the sensing signal SEN to allow the driving reference voltage VpreR to be applied to the first node N1. The sensing reference voltage switch SPRE controls whether the sensing reference voltage VpreS is supplied to the read out line RVL.

When the sensing reference voltage switch SPRE is turned on, the sensing reference voltage VpreS is supplied to the read out line RVL. The sensing reference voltage VpreS supplied to the read out line RVL may be applied to the first node N1 through the sensing transistor SENT that has been turned on.

When a voltage at the first node N1 becomes a voltage state that reflects the characteristics of the pixel PX, a voltage of the lead out line RVL, which may be the same potential as the first node N1, may also become a voltage state that reflects the characteristics of the pixel PX. In this case, the line capacitor formed on the read out line RVL may be charged to the voltage that reflects the characteristics of the pixel PX. In other words, when the sensing transistor SENT is turned on, the voltage of the read out line RVL and the voltage charged in the line capacitor formed on the read out line RVL may be the same.

When the voltage at the first node N1 becomes a voltage state that reflects the characteristics of the pixel PX, the voltage of the read out line RVL may be sensed through the data driver 120 (see FIG. 1) and the timing controller 150 (see FIG. 1). Such a compensation method may be referred to as "external compensation method."

Figure 4:
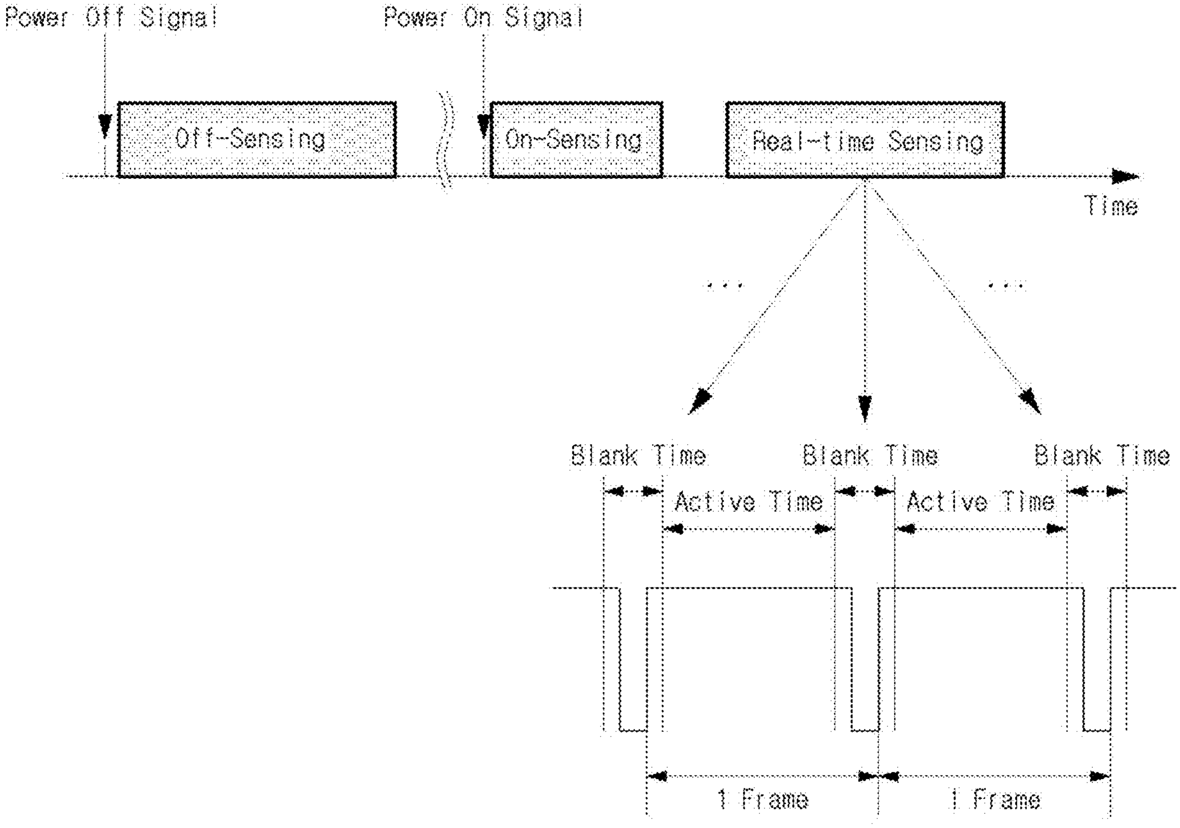
FIG. 4 is a view showing the sensing timing of the display device according to an embodiment.

FIG. 4 is a view showing the sensing timing of the display device according to one embodiment.

Referring to FIG. 4, the display device 100 (see FIG. 1) according to one embodiment may sense the characteristic values of the circuit elements in each pixel PX (see FIG. 1) disposed on the display panel 110 (see FIG. 1) after a power-off signal is generated according to a user input, etc. As described above, the sensing performed after the power-off signal is generated is referred to as "OFF sensing."

In addition, the display device 100 according to one embodiment may sense the characteristic values of the circuit elements in each pixel PX disposed on the display panel 110 before the display driving starts after the power-off signal is generated according to the user input, etc. As described above, sensing performed before the display driving starts after a power-on signal is generated is referred to as "ON sensing."

In addition, the display device 100 according to one embodiment may sense the characteristic values of the circuit elements in each pixel PX disposed on the display panel 110 during the display driving. As described above, sensing performed during the display driving is referred to as "real time sensing (RT sensing)." The RT sensing may be performed every blank time between active times within 1 frame based on the vertical synchronization signal.

Figure 5:
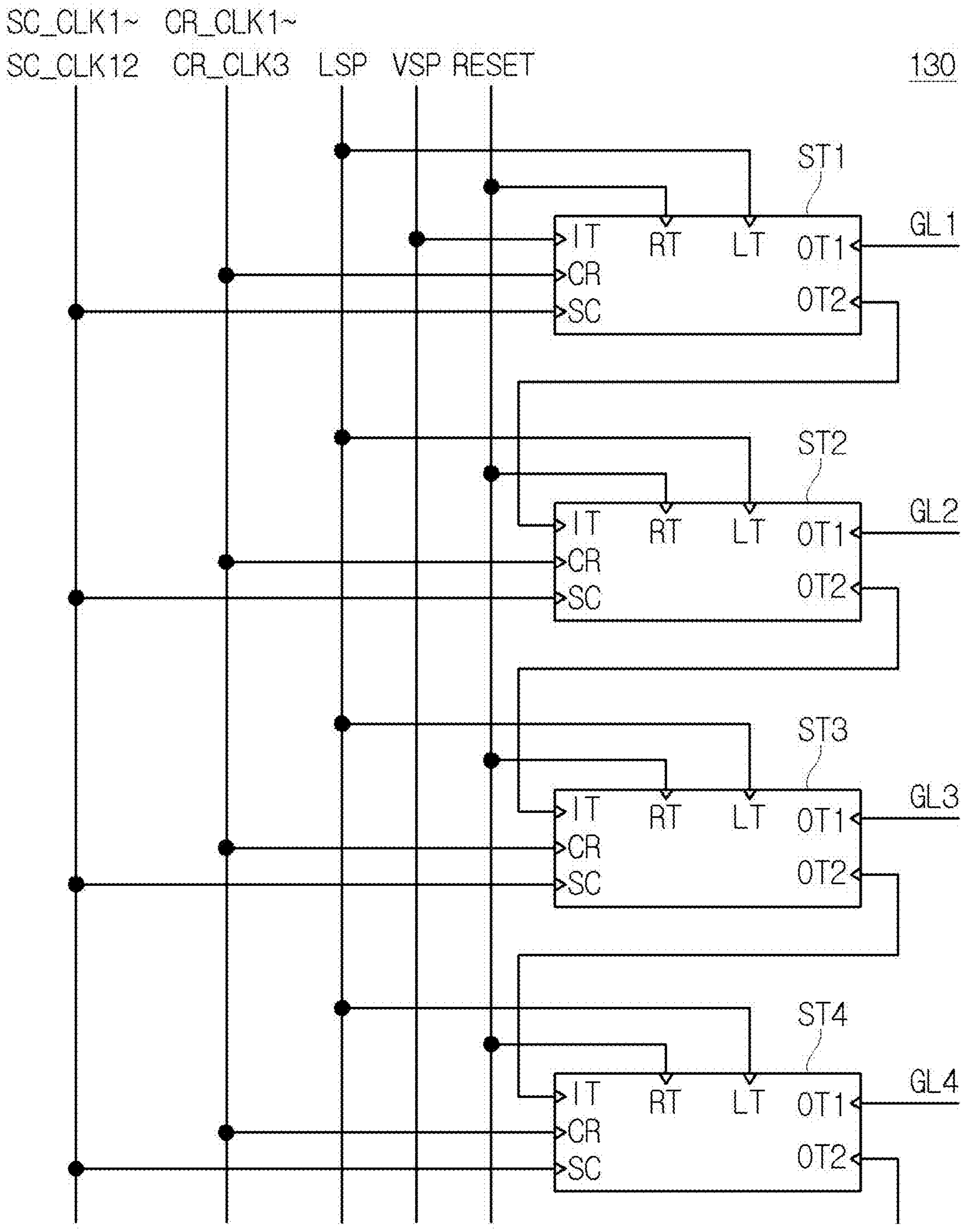
FIG. 5 is a block diagram schematically showing a structure of a gate driver according to an embodiment.

FIG. 5 is a block diagram schematically showing a structure of a gate driver according to one embodiment.

Referring to FIG. 5, the gate driver 130 may include a plurality of stage circuits ST1 to ST4. For convenience of description, FIG. 5 shows the four stage circuits ST1 to ST4 included in the gate driver 130.

The second stage circuit ST2 may be dependently connected to the first stage circuit ST1, the third stage circuit ST3 may be dependently connected to the second stage circuit ST2, and the fourth stage circuit ST4 may be dependently connected to the third stage circuit ST3. The first to fourth stage circuits ST1 to ST4 may have substantially the same configuration.

Each of the stage circuits ST1 to ST4 is configured to receive a start signal VSP, a reset signal RESET, a node charge signal LSP, carry clock signal CR_CLK1 to CR_CLK3, and gate clock signals SC_CLK1 to SC_CLK12 that are applied from the level shifter 140 (see FIG. 1). In the shown embodiment, although three carry clock signals CR_CLK1 to CR_CLK3 and 12 gate clock signals SC_CLK1 to SC_CLK12 are applied to the stage circuits ST1 to ST4, the present embodiment is not limited thereto, and a larger or fewer number of clock signals may be provided to the stage circuits ST1 to ST4.

The gate clock signals SC_CLK1 to SC_CLK12 may have the same waveform and may be clock signals having phases shifted at predetermined intervals. For example, the first gate clock signal SC_CLK1 has non-shifted phase, the second gate clock signal SC_CLK2 may have a phase shifted by 1/12 cycle with respect to the first gate clock signal SC_CLK1, and the third gate clock signal SC_CLK3 may have a phase shifted by 1/12 cycle with respect to the second gate clock signal SC_CLK2 (1/6 cycle with respect to the first gate clock signal SC_CLK1). The stage circuits ST1 to ST4 may be configured to receive the corresponding one of the gate clock signals SC_CLK1 to SC_CLK12.

The carry clock signals CR_CLK1 to CR_CLK3 may have the same waveform and may be clock signals having phases shifted at predetermined intervals. For example, the first carry clock signal CR_CLK1 has a non-shifted phase, the second carry clock signal CR_CLK2 may have a phase shifted by 1/3 cycle with respect to the first carry clock signal CR_CLK1, and the third carry clock signal CR_CLK3 may have a phase shifted by 1/3 cycle with respect to the second carry clock signal CR_CLK2 (2/3 cycle with respect to the first carry clock signal CR_CLK1). The stage circuits ST1 to ST4 may be configured to receive the corresponding one of the carry clock signals CR_CLK1 to CR_CLK3.

Each of the stage circuits ST1 to ST4 may include an input terminal IT, output terminals OT1 and OT2, a reset terminal RT, an LSP terminal LT, a carry clock terminal CR, and a gate clock terminal SC.

The input terminal IT of the first stage circuit ST1 may be configured to receive the start signal VSP. The input terminals IT of the subsequent stage circuits ST2 to ST4 may be connected to the second output terminal OT2 of the previous stage circuit. For example, the input terminal IT of the second stage circuit ST2 may be connected to the second output terminal OT2 of the first stage circuit ST1, the input terminal IT of the third stage circuit ST3 may be connected to the second output terminal OT2 of the second stage circuit ST2, and the input terminal IT of the fourth stage circuit ST4 may be connected to the second output terminal OT2 of the third stage circuit ST3.

Each of the stage circuits ST1 to ST4 may output the gate signal to the corresponding gate lines GL1 to GL4 through the first output terminal OT1. Each of the stage circuits ST1 to ST4 is pulled-up by the node charge signal LSP input to the LSP terminal LT and the start signal VSP input to the input terminal IT or the carry signal of the previous stage circuit to output the gate clock signals SC_CLK1 to SC_CLK12 input to the gate clock terminal SC to the first output terminal OT1. In addition, each of the stage circuits ST1 to ST4 may output the carry clock signals CR_CLK1 to CR_CLK3 to the next stage circuit connected through the second output terminal OT2.

Each of the stage circuits ST1 to ST4 may be reset by being pulled down in response to the reset signal RESET input to the reset terminal RT. In addition, each of the stage circuits ST1 to ST4 is pulled up in response to the node charge signal LSP input to the LSP terminal LT and thus becomes a state that may output the gate signal.

Figure 6:
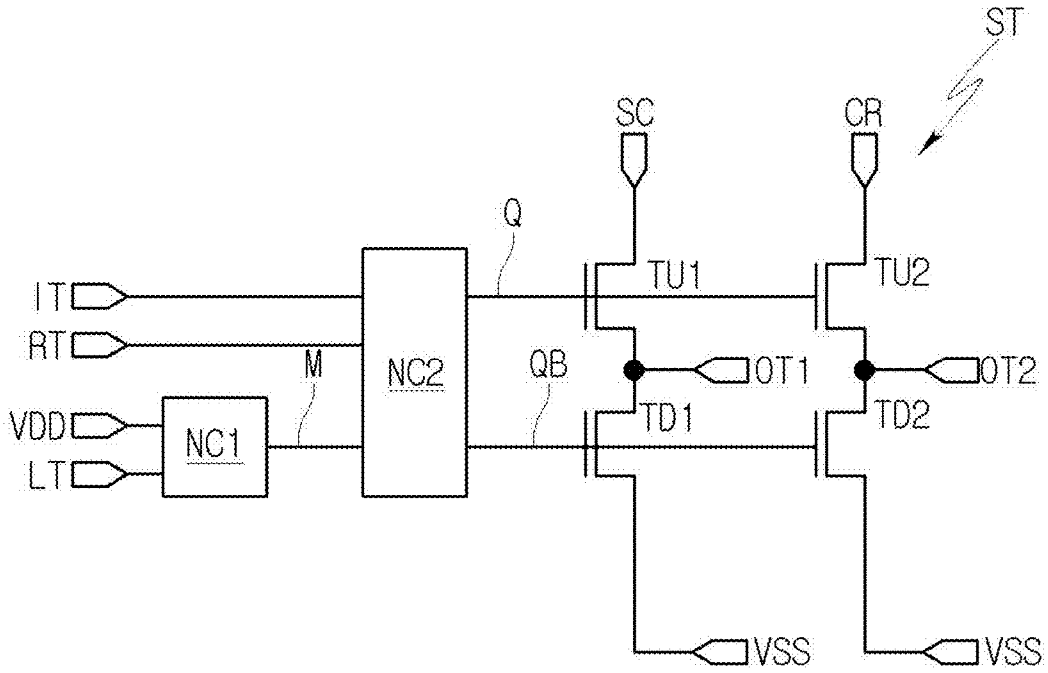
FIG. 6 is a block diagram schematically showing a stage circuit of FIG. 5.

FIG. 6 is a block diagram schematically showing a stage circuit of FIG. 5.

Referring to FIGS. 5 and 6 together, the stage circuit ST may include a pull-up node Q, a pull-down node QB, pull-up transistors TU1 and TU2, pull-down transistors TD1 and TD2, and node controllers NC1 and NC2.

The first and second node controllers NC1 and NC2 control charging and discharging of the pull-up node Q and the pull-down node QB.

The first node controller NC1 may charge a charge node M according to the node charge signal LSP input to the LSP terminal LT. The second node controller NC2 may transmit a voltage at the charge node M to the pull-up node Q according to the start signal VSP input to the input terminal IT or the carry signal of the previous stage circuit and charge the pull-up node Q charged to the gate-on voltage. In addition, the second node controller NC2 may charge the pull-down node QB to the gate-on voltage according to the reset signal RESET input to the reset terminal RT.

To stably control the output of the stage circuit ST, the second node controller NC2 may be configured to discharge the pull-down node QB to the gate-off voltage when the pull-up node Q is charged to the gate-on voltage and discharge the pull-up node Q to the gate-off voltage when the pull-down node QB is charged to the gate-on voltage.

The pull-up transistors TU1 and TU2 are turned on when the pull-up node Q is charged to the gate-on voltage. The pull-down transistor TD is turned on when the pull-down node QB is charged to the gate-on voltage.

For example, the first pull-up transistor TU1 is turned on when the pull-up node Q is charged to the gate-on voltage to output the gate clock signal SC_CLK input to the gate clock terminal SC to the first output terminal OT1. For example, the second pull-up transistor TU2 is turned on when the pull-up node Q is charged to the gate-on voltage to output the carry clock signal CR_CLK input to the carry clock terminal CR to the second output terminal OT2.

When the pull-down node QB is charged to the gate-on voltage, the pull-down transistors TD1 and TD2 are turned on to discharge the first output terminal OT1 and the second output terminal OT2 to a low potential voltage VSS. The low potential voltage may be the same voltage as the gate-off voltage.

Figure 7:
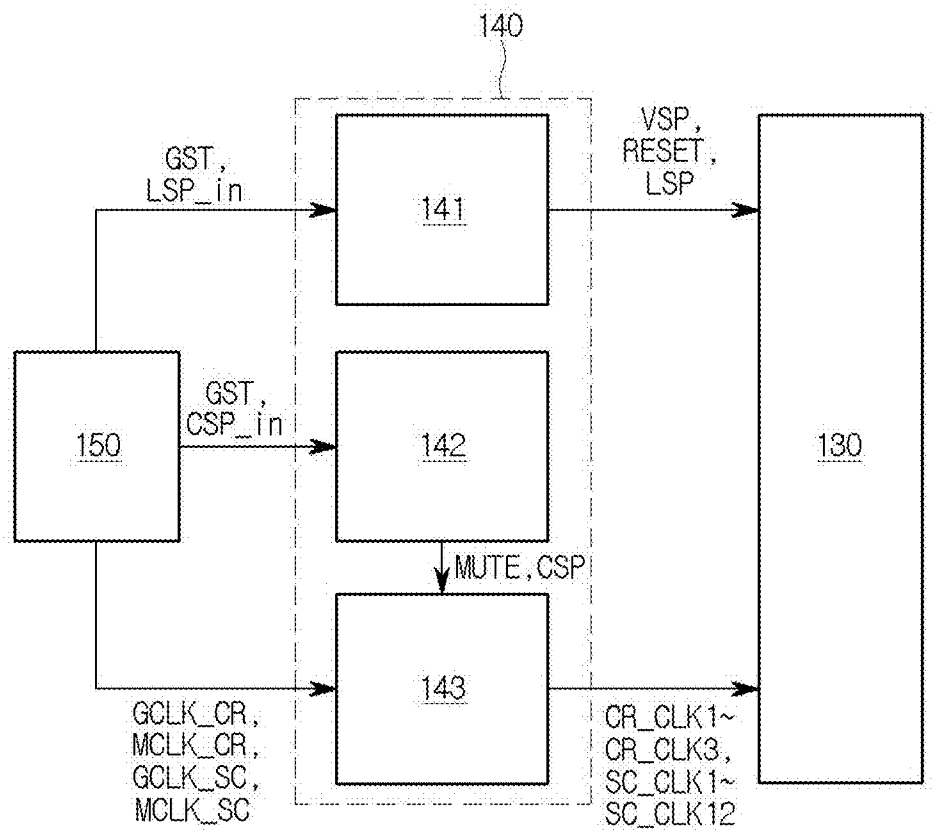
FIG. 7 is a block diagram showing the connection relationship between a timing controller, a level shifter, and a gate driver according to an embodiment.

FIG. 7 is a block diagram showing the connection relationship between a timing controller, a level shifter, and a gate driver according to the first embodiment.

Referring to FIG. 7, the timing controller 150 may output the start control signal GST, the clock shift stop control signal CSP_in, the node charge control signal LSP_in, the first carry clock control signal GCLK_CR, the second carry clock control signal MCLK_CR, the first gate clock control signal GCLK_SC, and the second gate clock control signal MCLK_SC.

The timing controller 150 operates the display device 100 (see FIG. 1) in a display mode for the active time (see FIG. 4) within one frame. To this end, the timing controller 150 may output the node charge control signal LSP_in in response to the display mode. In addition, the timing controller 150 operates the display device 100 in a sensing mode for the blank time (see FIG. 4) within one frame. To this end, the timing controller 150 may output the clock shift stop control signal CSP_in in response to the sensing mode.

The timing controller 150 may further drive the display device 100 in a reset mode in which the gate driver 130 is reset and a line selection mode in which a pixel line to be sensed is selected for the blank time. The timing controller 150 may output the start control signal GST in response to the reset mode and output both the start control signal GST and the clock shift stop control signal CSP_in in response to the line selection mode.

The timing controller 150 may output the first carry clock control signal GCLK_CR, the second carry clock control signal MCLK_CR, the first gate clock control signal GCLK_SC, and the second gate clock control signal MCLK_SC at different phases and/or cycles in response to the display mode and the sensing mode.

The level shifter 140 may receive one or more of the start control signal GST, the clock shift stop control signal CSP_in, the node charge control signal LSP_in, the first carry clock control signal GCLK_CR, the second carry clock control signal MCLK_CR, the first gate clock control signal GCLK_SC, and the second gate clock control signal MCLK_SC that are output from the timing controller 150, in various operation modes. Based on the received signals, the level shifter 140 may generate and output the start signal VSP, the reset signal RESET, the node charge signal LSP, the carry clock signals CR_CLK1 to CR_CLK3, and the gate clock signals SC_CLK1 to SC_CLK12.

To this end, the level shifter 140 may include a first circuit unit 141, a second circuit unit 142, and a third circuit unit 143.

The first circuit unit 141 may receive the start control signal GST and the node charge control signal LSP_in from the timing controller 150 and output the start signal VSP, the reset signal RESET, and the node charge signal LSP accordingly. For example, the first circuit unit 141 may output the start signal VSP and the node charge signal LSP when receiving the start control signal GST and the node charge control signal LSP_in, and output the reset signal RESET when receiving the start control signal GST without the node charge control signal LSP or with the node charge control signal LSP at a turn-on level.

The second circuit unit 142 may receive the start control signal GST and the clock shift stop control signal CSP_in from the timing controller 150 and output an output erase signal MUTE and the clock shift stop signal CSP accordingly. For example, when the timing controller 150 outputs the start control signal GST and the clock shift stop control signal CSP_in in response to the line selection mode, the second circuit unit 142 may output the output erase signal MUTE in response to the start control signal GST and the clock shift stop signal CSP. In addition, when the timing controller 150 outputs the clock shift stop control signal CSP_in in response to the sensing mode, the second circuit unit 142 may output the clock shift stop signal CSP in response to the clock shift stop control signal CSP_in.

The third circuit unit 143 may generate the plurality of carry clock signals CR_CLK1 to CR_CLK3 and the gate clock signals SC_CLK1 to SC_CLK12 from the first carry clock control signal GCLK_CR, the second carry clock control signal MCLK_CR, the first gate clock control signal GCLK_SC, and the second gate clock control signal MCLK_SC that are input from the timing controller 150. The third circuit unit 143 may sequentially output the generated carry clock signals CR_CLK1 to CR_CLK3 and gate clock signals SC_CLK1 to SC_CLK12 to the gate driver 130.

For example, the third circuit unit 143 may generate the carry clock signals CR_CLK1 to CR_CLK3 to rise in synchronization with a rising edge of the first carry clock control signal GCLK_CR and fall in synchronization with a falling edge of the second carry clock control signal MCLK_CR. In addition, the third circuit unit 143 may generate the plurality of gate clock signals, e.g., 12 gate clock signals SC_CLK1 to SC_CLK12, to rise in synchronization with a rising edge of the first gate clock control signal GCLK_SC and fall in synchronization with a falling edge of the second gate clock control signal MCLK_SC.

The third circuit unit 143 may control the output of the carry clock signals CR_CLK1 to CR_CLK3 and the gate clock signals SC_CLK1 to SC_CLK12 in response to the output erase signal MUTE and the clock shift stop signal CSP that are output from the second circuit unit 142. For example, the third circuit unit 143 stops the output of the carry clock signals CR_CLK1 to CR_CLK3 and the gate clock signals SC_CLK1 to SC_CLK12 in response to the output erase signal MUTE. In other words, even when receiving the clock control signals GCLK_CR, MCLK_CR, GCLK_SC, and MCLK_SC from the timing controller 150 while the output erase signal MUTE is received at the third circuit unit 143, the third circuit unit 143 does not generate or output the clock signals CR_GCLK and SC_GCLK corresponding to the clock control signals GCLK_CR, MCLK_CR, GCLK_SC, and MCLK_SC.

Alternatively or additionally, while the output erase signal MUTE is received from the second circuit unit 142, the third circuit unit 143 may count pulses of the clock control signals GCLK_CR, MCLK_CR, GCLK_SC, and MCLK_SC provided from the timing controller 150. For example, the third circuit unit 143 may acquire a first pulse counting number by counting the number of times of pulse generation of the first carry clock control signal GCLK_CR and/or the number of times of pulse generation of the second carry clock control signal MCLK_CR and acquire a second pulse counting number by counting the number of times of pulse generation of the first gate clock control signal GCLK_SC and/or the number of times of pulse generation of the second gate clock control signal MCLK_SC. However, the present embodiment is not limited thereto. In some embodiments, the third circuit unit 143 may acquire the pulse counting number by counting rising edges and/or falling edges of the clock control signals GCLK_CR, MCLK_CR, GCLK_SC, and MCLK_SC.

The third circuit unit 143 may generate the carry clock signals CR_CLK1 to CR_CLK3 and the gate clock signals SC_CLK1 to SC_CLK12 that correspond to the pulse counting number in response to the clock shift stop signal CSP. For example, the third circuit unit 143 may generate and output the carry clock signals CR_CLK1 to CR_CLK3 having shifted phases corresponding to the first pulse counting number. In addition, the third circuit unit 143 may generate and output the gate clock signals SC_CLK1 to SC_CLK12 having shifted phases corresponding to at least one of the carry clock signals CR_CLK1 to CR_CLK3, which have been determined based on the first pulse counting number, and the second pulse counting number.

While the clock shift stop signal CSP is input at the turn-on level, the phase shift of the clock signals CR_CLK1 to CR_CLK3 and SC_CLK1 to SC_CLK12 output from the third circuit unit 143 is stopped. Therefore, while the clock shift stop signal CSP is input at the turn-on level, one of the carry clock signals CR_CLK1 to CR_CLK3 and one of the gate clock signals SC_CLK1 to SC_CLK12 that are selected corresponding to the pulse counting number may be output.

The gate driver 130 may generate the gate signal based on the start signal VSP, the reset signal RESET, and the node charge signal LSP that are transmitted from the first circuit unit 141 of the level shifter 140, and the carry clock signals CR_CLK1 to CR_CLK3 and the gate clock signals SC_CLK1 to SC_CLK12 that are sequentially transmitted from the third circuit unit 143 of the level shifter 140, and output the gate signal to the gate line GL.

For example, the gate driver 130 operates in the display mode for the active time within one frame. The gate driver 130 may receive the carry clock signals CR_CLK1 to CR_CLK3 and the gate clock signals SC_CLK1 to SC_CLK12 in the display mode and generate and output the gate signal based on the carry clock signals CR_CLK1 to CR_CLK3 and the gate clock signals SC_CLK1 to SC_CLK12.

In the line selection mode of the blank time within one frame, the level shifter 140 does not output the carry clock signals CR_CLK1 to CR_CLK3 and the gate clock signals SC_CLK1 to SC_CLK12, and the gate driver 130 does not generate and output the gate signal. In the sensing mode of the blank time, the gate driver 130 may generate the gate signal based on the carry clock signals CR_CLK1 to CR_CLK3 and the gate clock signals SC_CLK1 to SC_CLK12 that are provided from the level shifter 140 and output the gate signal to the pixel line selected during the line selection mode.

Figure 8:
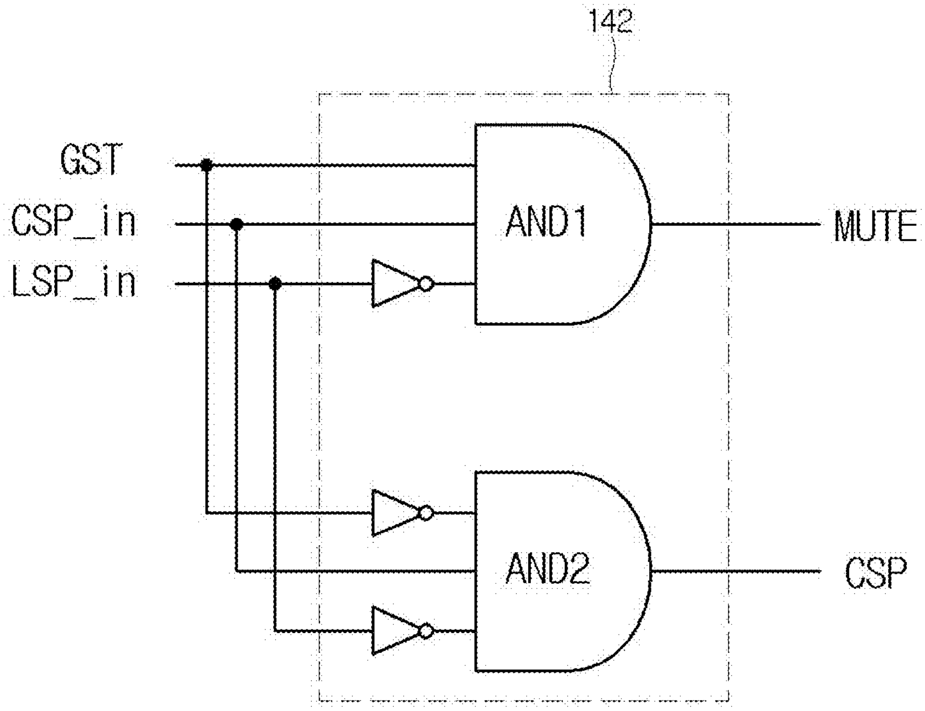
FIG. 8 is a view showing a configuration of a second circuit unit shown in FIG. 7.
Figure 9:
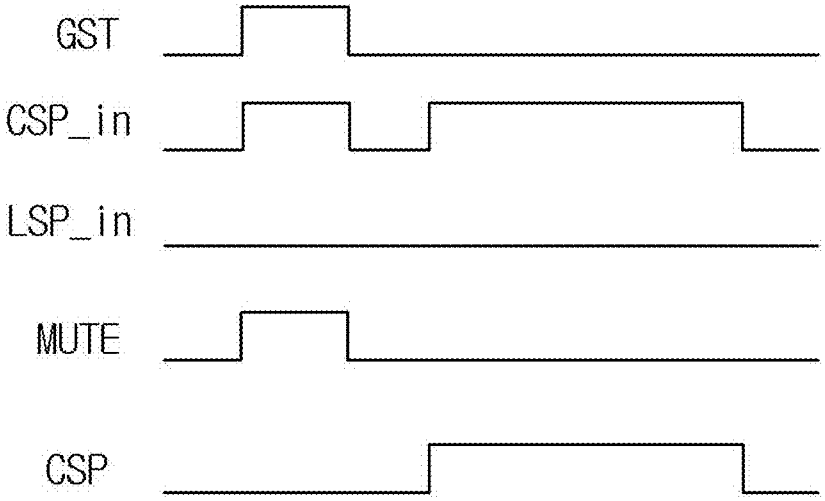
FIG. 9 is a view showing input/output signal waveforms of the second circuit unit shown in FIG. 8.

FIG. 8 is a view showing a configuration of the second circuit unit shown in FIG. 7. FIG. 9 is a view showing input/output signal waveforms of the second circuit unit shown in FIG. 8.

Referring to FIG. 8, the second circuit unit 142 may receive the start control signal GST and the clock shift stop control signal CSP_in and output the output erase signal MUTE and the clock shift stop signal CSP accordingly. In one embodiment, the second circuit unit 142 may be configured as a logic circuit to generate the output erase signal MUTE and the clock shift stop control signal CSP through a predetermined logical operation from the start control signal GST and the clock shift stop control signal CSP_in. For example, the second circuit unit 142 may be composed of predetermined logic gates AND1 and AND2.

The first logic gate AND1 may be an AND gate. The first logic gate AND1 receives the start control signal GST and the clock shift stop control signal CSP_in. As shown in FIG. 9, the first logic gate AND1 may output the output erase signal MUTE at a logic high level when the input start control signal GST and the input clock shift stop control signal CSP_in are both at turn-on levels, e.g., logic high levels.

The second logic gate AND2 may be an AND gate. The second logic gate AND2 receives an inverted signal of the start control signal GST through a NAND gate with the clock shift stop control signal CSP_in. As shown in FIG. 9, the second logic gate AND2 may output the clock shift stop signal CSP at a logic high level when the inverted signal of the input start control signal GST and the input clock shift stop control signal CSP_in are both at logic high levels.

In one embodiment, the second circuit unit 142 may be configured to further receive the node charge control signal LSP_in. For example, the first logic gate AND1 and the second logic gate AND2 are configured to receive the inverted signal of the node charge control signal LSP_in through the NAND gate. Therefore, when the node charge control signal LSP_in is output at the turn-on level to drive the display device 100 (see FIG. 1) in the display mode for the active time (see FIG. 4), the output of the output erase signal MUTE or the clock shift stop control signal CSP_in can be prevented.

Figure 10:
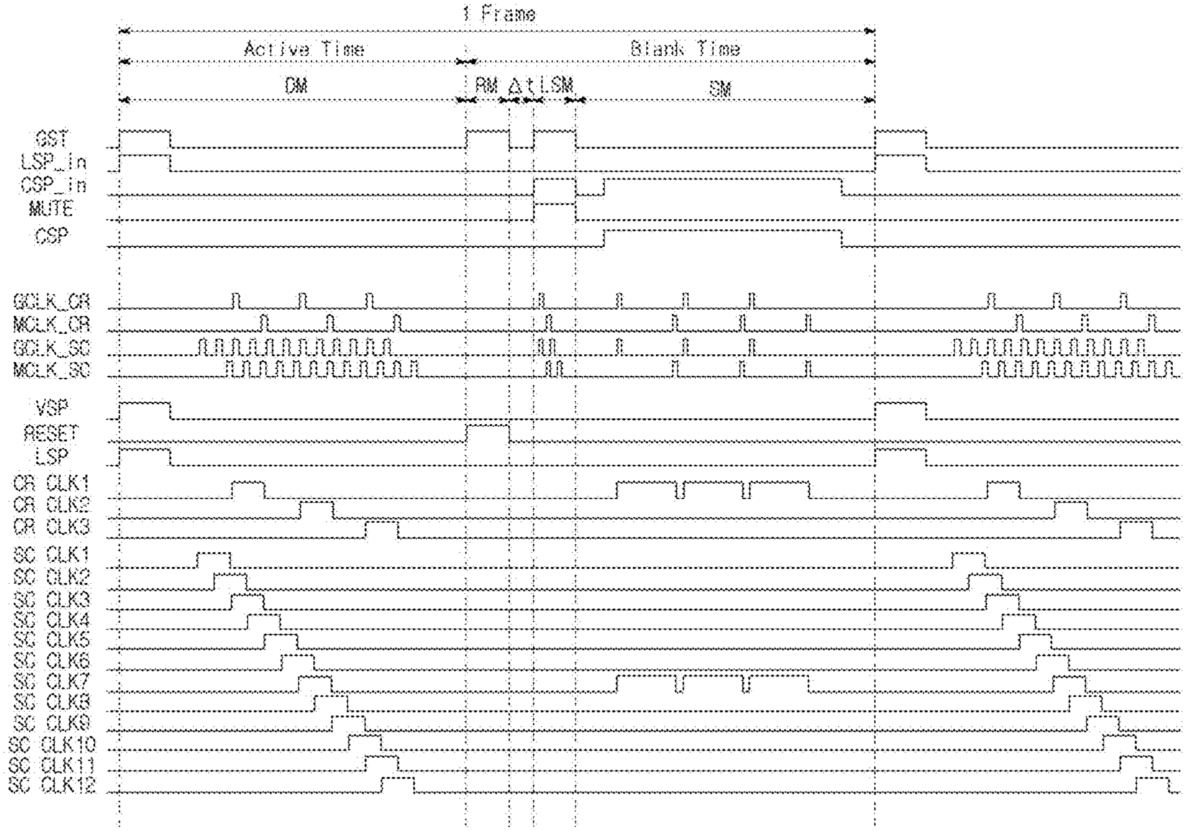
FIG. 10 is a timing diagram showing input/output signal waveforms of the timing controller, the level shifter, and the gate driver shown in FIG. 7.

FIG. 10 is a timing diagram showing input/output signal waveforms of the timing controller, the level shifter, and the gate driver shown in FIG. 7.

Referring to FIG. 10, one frame may include the active time and the blank time. For the active time, the display device 100 (see FIG. 1) may operate in the display mode DM in which images are displayed, and for the blank time, the display device 100 may operate in the sensing mode SM in which the characteristic values of the pixels P (see FIG. 1) are sensed. To select the pixel line to be sensed in the corresponding frame, the display device 100 may operate in the line selection mode LSM before the sensing mode SM for the blank time.

Referring to FIG. 7 together, as the start control signal GST and the node charge control signal LSP_in are output at the turn-on levels from the timing controller 150 for the active time, the display device 100 may operate in the display mode DM. The level shifter 140 outputs the start signal VSP and the node charge signal LSP in response to the start control signal GST and the node charge control signal LSP_in at the turn-on levels. Then, the stage circuits ST1 to ST4 (see FIG. 5) of the gate driver 130 are pulled up by the start signal VSP and the node charge signal LSP to become states that may output the gate signal.

Thereafter, during the display mode DM, the timing controller 150 outputs the clock control signals GCLK_CR, MCLK_CR, GCLK_SC, and MCLK_SC corresponding to the display mode DM. The level shifter 140 sequentially generates and outputs the plurality of carry clock signals CR_CLK1 to CR_CLK3 that rise in synchronization with the rising edge of the first carry clock control signal GCLK_CR and fall in synchronization with the falling edge of the second carry clock control signal MCLK_CR. In addition, the level shifter 140 sequentially generates and outputs the plurality of gate clock signals SC_CLK1 to SC_CLK12 that rise in synchronization with the rising edge of the first gate clock control signal GCLK_SC and fall in synchronization with the falling edge of the second gate clock control signal MCLK_SC.

The stage circuits ST1 to ST4 in the pull-up state may sequentially output the carry signals based on the carry clock signals CR_CLK1 to CR_CLK3 output from the level shifter 140 and sequentially output the gate signals to the gate lines GL (see FIG. 1) of the display panel 110 (see FIG. 1) based on the gate clock signals SC_CLK1 to SC_CLK12.

For the blank time, as the start control signal GST is output at the turn-on level from the timing controller 150, the display device 100 may operate in the reset mode RM. The level shifter 140 outputs the reset signal RESET in response to the start control signal GST at the turn-on level. The gate driver 130 may be initialized to a pull-down state in response to the reset signal RESET.

Thereafter, as the start control signal GST and the clock shift stop control signal CSP_in are output at the turn-on level from the timing controller 150, the display device 100 may operate in the line selection mode LSM. The level shifter 140 may generate the output erase signal MUTE in response to the start control signal GST and the clock shift stop control signal CSP_in at the turn-on levels.

While the output erase signal MUTE is generated, the level shifter 140 does not generate the carry clock signals CR_CLK1 to CR_CLK3 and the gate clock signals SC_CLK1 to SC_CLK12. In other words, even when receiving the clock control signals GCLK_CR, MCLK_CR, GCLK_SC, and MCLK_SC from the timing controller 150 while the output erase signal MUTE is generated, the level shifter 140 does not generate or output the clock signals CR_GCLK and SC_GCLK corresponding to the clock control signals GCLK_CR, MCLK_CR, GCLK_SC, and MCLK_SC. Therefore, the gate signal is not output from the gate driver 130.

Alternatively or additionally, the level shifter 140 may count pulses of the clock control signals GCLK_CR, MCLK_CR, GCLK_SC, and MCLK_SC applied from the timing controller 150. For example, the level shifter 140 may acquire the first pulse counting number by counting the number of times of pulse generation of the first carry clock control signal GCLK_CR and/or the number of times of pulse generation of the second carry clock control signal MCLK_CR and acquire the second pulse counting number by counting the number of times of pulse generation of the first gate clock control signal GCLK_SC and/or the number of times of pulse generation of the second gate clock control signal MCLK_SC. In the shown embodiment, since the pulse of the first carry clock control signal GCLK_CR and the pulse of the second carry clock control signal MCLK_CR are each generated once, the first pulse counting number is (1, 1), and since the pulse of the first gate clock control signal GCLK_SC and the pulse of the second gate clock control signal MCLK_SC are each generated twice, the second pulse counting number is (2, 2).

The level shifter 140 may determine the phases of the carry clock signals CR_CLK1 to CR_CLK3 and the gate clock signals SC_CLK1 to SC_CLK12 based on the acquired pulse counting numbers. For example, when the first pulse counting number is 1, during the sensing mode SM, the level shifter 140 may select the second carry clock signal CR_CLK2 having a phase shifted by ⅓ cycle. In addition, when the first pulse counting number is (1, 1) and the second pulse counting number is (2, 2), during the sensing mode SM, the level shifter 140 may select a seventh gate clock signal SC_CLK7 having a phase shifted by 7/12 cycle.

In one embodiment, the first pulse counting number and the corresponding carry clock signals CR_CLK1 to CR_CLK3 may be defined as shown in Table 1 below.

TABLE 1

| GCLK_CR | MCLK_CR | CR_CRK |
|---|---|---|
| 0 | 0 | CR_CLK1 |
| 1 | 1 | CR_CRK2 |
| 2 | 2 | CR_CRK3 |

In addition, the carry clock signals CR_CLK1 to CR_CLK3 determined corresponding to the first pulse counting number, the second pulse counting number, and the corresponding gate clock signals SC_CLK1 to SC_CLK12 may be defined as shown in Table 2 below.

TABLE 2

| CR_CRK | GCLK_SC | MCLK_SC | SC_CLK |
|---|---|---|---|
| CR_CRK1 | 0 | 0 | SC_CLK1 |
| | 1 | 1 | SC_CLK2 |
| | 2 | 2 | SC_CLK3 |
| | 3 | 3 | SC_CLK4 |
| CR_CRK2 | 0 | 0 | SC_CLK5 |
| | 1 | 1 | SC_CLK6 |
| | 2 | 2 | SC_CLK7 |
| | 3 | 3 | SC_CLK8 |
| CR_CRK3 | 0 | 0 | SC_CLK9 |
| | 1 | 1 | SC_CLK10 |
| | 2 | 2 | SC_CLK11 |
| | 3 | 3 | SC_CLK12 |

However, the combinations of the pulse counting numbers and the corresponding clock signals CR_CLK1 to CR_CLK3, SC_CLK1 to SC_CLK12 are not limited thereto.

Thereafter, as the clock shift stop control signal CSP_in is output at the turn-on level from the timing controller 150, the display device 100 may operate in the sensing mode SM. The level shifter 140 may generate the clock stop signal CSP in response to the clock shift stop control signal CST_in at the turn-on level.

While outputting the clock stop signal CSP, the level shifter 140 may generate and output the selected carry clock signals CR_CLK1 to CR_CLK3 and gate clock signals SC_CLK1 to SC_CLK12 in synchronization with the rising edges and falling edges of the clock control signals GCLK_CR, MCLK_CR, GCLK_SC, and MCLK_SC provided from the timing controller 150.

The stage circuits ST1 to ST4 of the gate driver 130 may output the carry signals based on the carry clock signals CR_CLK1 to CR_CLK3 output from the level shifter 140 and output the gate signals to the corresponding gate lines based on the gate clock signals SC_CLK1 to SC_CLK12. Since one carry clock signal CR_CLK1 and one gate clock signal SC_CLK2 are provided during the sensing mode SM, the gate signal may be selectively output from the corresponding one of the stage circuits ST1 to ST4. Therefore, sensing may be performed on one (or more) pixel lines selected during line selection mode LSM.

In the shown embodiment, during the blank time, the display panel 110 operates in the reset mode RM in response to the reset signal RESET, then operates in the line selection mode LSM in response to the output erase signal MUTE, and then operates in the sensing mode SM in response to the clock shift stop signal CSP. Here, a delay time Δt for predetermined signal processing is present between the line selection mode LSM and the sensing mode SM. Therefore, since the operating time in the sensing mode SM is relatively decreased for the limited blank time, sufficient pixel sensing and compensation cannot be achieved. Such a phenomenon may especially occur in large-area and high-resolution display devices. Hereinafter, another embodiment of the display device 100 for securing the sensing time will be described.

Figure 11:
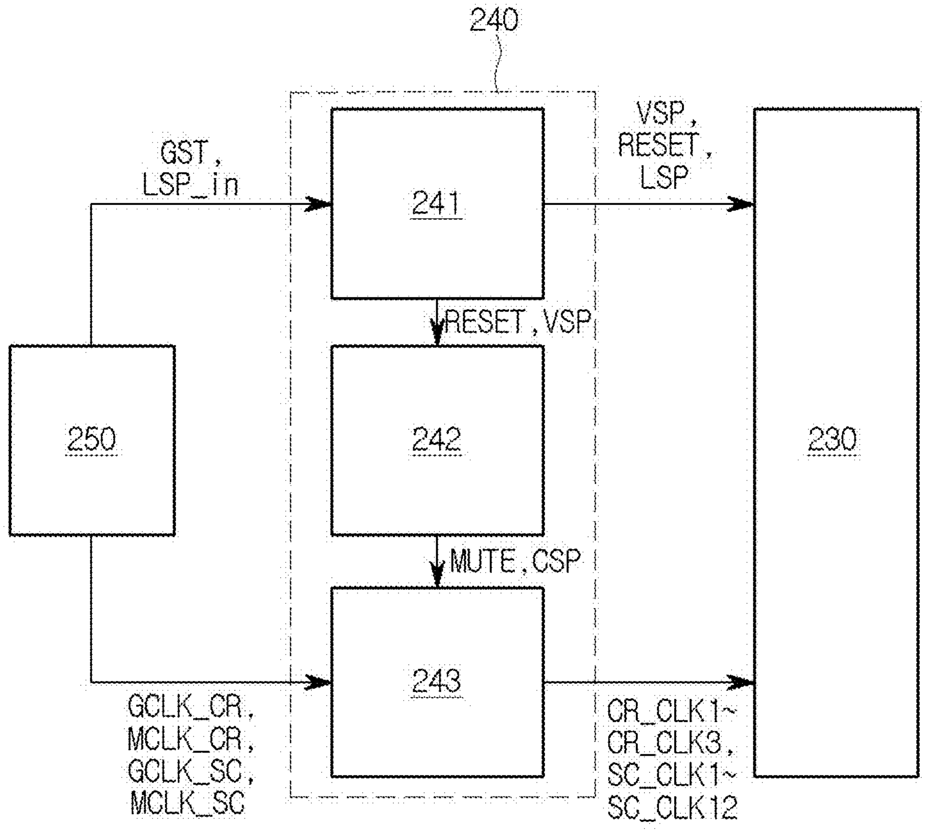
FIG. 11 is a block diagram showing the connection relationship between a timing controller, a level shifter, and a gate driver according to an embodiment.

FIG. 11 is a block diagram showing the connection relationship between a timing controller, a level shifter, and a gate driver according to a second embodiment.

Referring to FIG. 11, a timing controller 250 may output the start control signal GST, the node charge control signal LSP_in, the first carry clock control signal GCLK_CR, the second carry clock control signal MCLK_CR, the first gate clock control signal GCLK_SC, and the second gate clock control signal MCLK_SC.

The timing controller 250 operates the display device 100 (see FIG. 1) in the display mode for the active time (see FIG. 4) within one frame. To this end, the timing controller 250 may output the node charge control signal LSP_in in response to the display mode.

The timing controller 250 may further drive the display device 100 in a reset and line selection mode in which a gate driver 230 is reset and the pixel line to be sensed is selected for the blank time. The timing controller 250 may output the start control signal GST in response to the reset and line selection mode.

The timing controller 250 may output the first carry clock control signal GCLK_CR, the second carry clock control signal MCLK_CR, the first gate clock control signal GCLK_SC, and the second gate clock control signal MCLK_SC at different phases and/or cycles in response to the display mode and the sensing mode.

A level shifter 240 may receive the start control signal GST, the node charge control signal LSP_in, the first carry clock control signal GCLK_CR, the second carry clock control signal MCLK_CR, the first gate clock control signal GCLK_SC, and the second gate clock control signal MCLK_SC that are output from the timing controller 250. Based on the received signals, the level shifter 240 may generate and output the start signal VSP, the reset signal RESET, the node charge signal LSP, the carry clock signals CR_CLK1 to CR_CLK3, and the gate clock signals SC_CLK1 to SC_CLK12.

To this end, the level shifter 240 may include a first circuit unit 241, a second circuit unit 242, and a third circuit unit 243.

The first circuit unit 241 may receive the start control signal GST and the node charge control signal LSP_in from the timing controller 250 and output the start signal VSP, the reset signal RESET, and the node charge signal LSP accordingly. For example, the first circuit unit 241 may output the start signal VSP and the node charge signal LSP (at the turn-on levels) when receiving the start control signal GST and the node charge control signal LSP_in (at the turn-on levels), and output the reset signal RESET (at the turn-on level) when receiving the start control signal GST (at the turn-on level).

The second circuit unit 242 may receive the reset signal RESET and the start signal VSP from the first circuit unit 241 and output the output erase signal MUTE and the clock shift stop signal CSP accordingly. For example, when the first circuit unit 241 outputs the reset signal RESET (at the turn-on level) in response to the reset and line selection mode, the second circuit unit 242 may output the output erase signal MUTE (at the turn-on level) in response to the reset signal RESET. In addition, when the first circuit unit 241 stops the output of the reset signal RESET (e.g., when outputting the reset signal RESET at the turn-off level) in response to the sensing mode, the second circuit unit 242 may output the clock shift stop signal CSP (at the turn-on level) in response thereto, and when the first circuit unit 241 outputs the start signal VSP (at the turn-on level) in response to the display mode, the second circuit unit 242 may stop the output of the clock shift stop signal CSP (e.g., when outputting the clock shift stop signal CSP at the turn-off level) in response thereto. In other words, the second circuit unit 242 may output the clock shift stop signal CSP to rise in synchronization with the falling edge of the reset signal RESET and fall in synchronization with the rising edge of the start signal VSP.

The third circuit unit 243 may generate the plurality of carry clock signals CR_CLK1 to CR_CLK3 and the gate clock signals SC_CLK1 to SC_CLK12 from the first carry clock control signal GCLK_CR, the second carry clock control signal MCLK_CR, the first gate clock control signal GCLK_SC, and the second gate clock control signal MCLK_SC that are input from the timing controller 250. The third circuit unit 243 may sequentially output the generated carry clock signals CR_CLK1 to CR_CLK3 and gate clock signals SC_CLK1 to SC_CLK12 to the gate driver 230.

For example, the third circuit unit 243 may generate the carry clock signals CR_CLK1 to CR_CLK3 to rise in synchronization with a rising edge of the first carry clock control signal GCLK_CR and fall in synchronization with a falling edge of the second carry clock control signal MCLK_CR. In addition, the third circuit unit 243 may generate the plurality of gate clock signals SC_CLK1 to SC_CLK12 to rise in synchronization with a rising edge of the first gate clock control signal GCLK_SC and fall in synchronization with a falling edge of the second gate clock control signal MCLK_SC.

The third circuit unit 243 may control the output of the carry clock signals CR_CLK1 to CR_CLK3 and the gate clock signals SC_CLK1 to SC_CLK12 in response to the output erase signal MUTE and the clock shift stop signal CSP (at the turn-on levels) that are output from the second circuit unit 242. For example, the third circuit unit 243 stops the output of the carry clock signals CR_CLK1 to CR_CLK3 and the gate clock signals SC_CLK1 to SC_CLK12 in response to the output erase signal MUTE (at the turn-on level).

While the output erase signal MUTE is input from the second circuit unit 242, the third circuit unit 243 may count the number of times of pulse generation of the clock control signals GCLK_CR, MCLK_CR, GCLK_SC, and MCLK_SC provided from the timing controller 250. For example, the third circuit unit 243 may acquire the first pulse counting number by counting the rising edge of the first carry clock control signal GCLK_CR and the falling edge of the second carry clock control signal MCLK_CR and acquire the second pulse counting number by counting the rising edge of the first gate clock control signal GCLK_SC and the falling edge of the second gate clock control signal MCLK_SC.

The third circuit unit 243 may generate the carry clock signals CR_CLK1 to CR_CLK3 and the gate clock signals SC_CLK1 to SC_CLK12 that correspond to the pulse counting number in response to the clock shift stop signal CSP. For example, the third circuit unit 243 may generate and output the carry clock signals CR_CLK1 to CR_CLK3 having shifted phases corresponding to the first pulse counting number. In addition, the third circuit unit 243 may generate and output the gate clock signals SC_CLK1 to SC_CLK12 having shifted phases corresponding to at least one of the first pulse counting number and the second pulse counting number.

While the clock shift stop signal CSP is input at the turn-on level, the phase shift of the clock signals CR_CLK1 to CR_CLK3 and SC_CLK1 to SC_CLK12 output from the third circuit unit 243 is stopped. Therefore, while the clock shift stop signal CSP is input at the turn-on level, one of the carry clock signals CR_CLK1 to CR_CLK3 and one of the gate clock signals SC_CLK1 to SC_CLK12 that are selected corresponding to the pulse counting number may be output.

The gate driver 230 may generate the gate signal based on the start signal VSP, the reset signal RESET, and the node charge signal LSP that are transmitted from the first circuit unit 241 of the level shifter 240, and the carry clock signals CR_CLK1 to CR_CLK3 and the gate clock signals SC_CLK1 to SC_CLK12 that are sequentially transmitted from the third circuit unit 243 of the level shifter 240, and output the gate signal to the gate line GL.

For example, the gate driver 230 operates in the display mode for the active time within one frame. The gate driver 230 may receive the carry clock signals CR_CLK1~CR_CLK3 and the gate clock signals SC_CLK1~SC_CLK12 in the display mode and generate and output the gate signal based on the carry clock signals CR_CLK1~CR_CLK3 and the gate clock signals SC_CLK1~SC_CLK12.

In the line selection mode of the blank time within one frame, the level shifter 140 does not output the carry clock signals CR_CLK1 to CR_CLK3 and the gate clock signals SC_CLK1 to SC_CLK12, and the gate driver 230 does not generate and output the gate signal. In the sensing mode of the blank time, the gate driver 230 may generate the gate signal based on the carry clock signals CR_CLK1 to CR_CLK3 and the gate clock signals SC_CLK1 to SC_CLK12 that are provided from the level shifter 240 and output the gate signal to the pixel line selected during the line selection mode.

Figure 12:
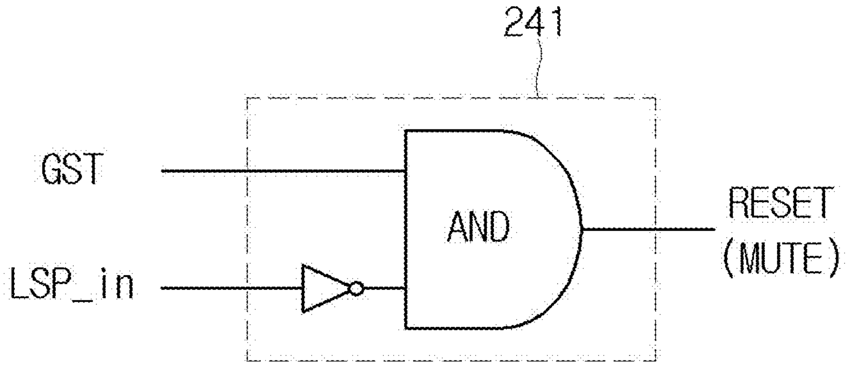
FIG. 12 is a view showing a configuration of a first circuit unit shown in FIG. 11.
Figure 13:
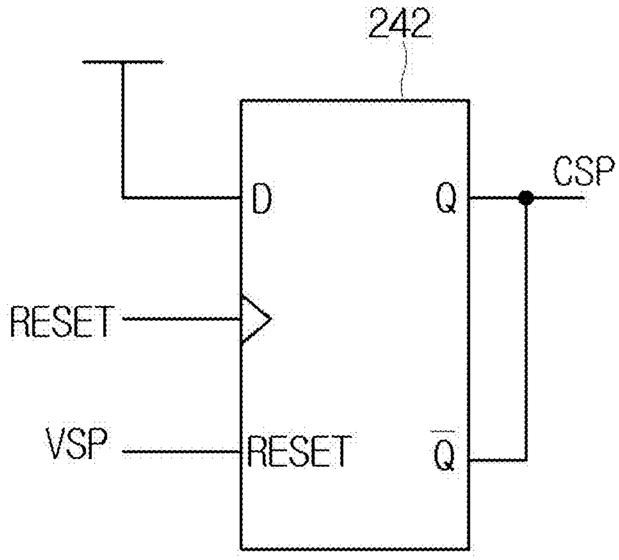
FIG. 13 is a view showing a configuration of the second circuit unit shown in FIG. 11.
Figure 14:
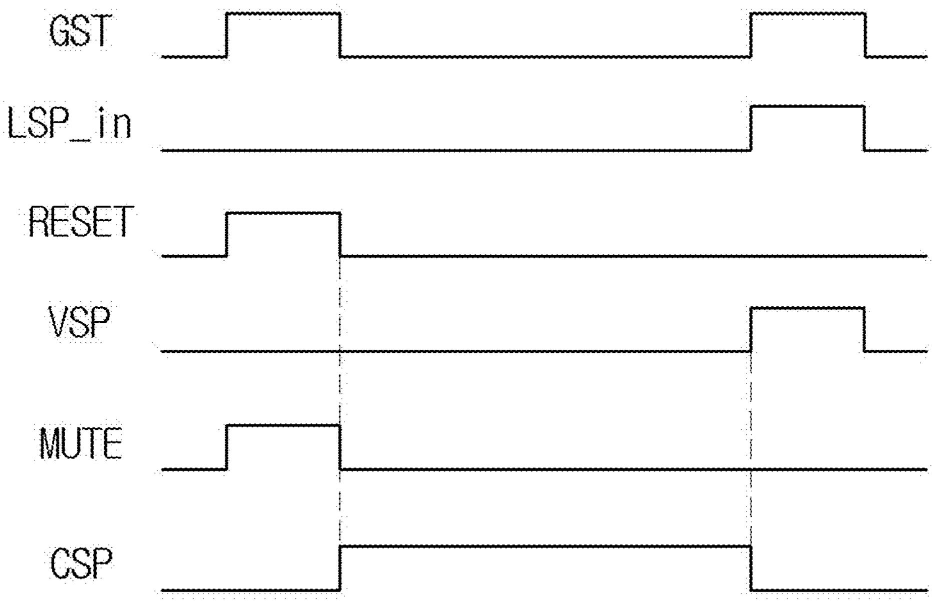
FIG. 14 is a view showing input/output signal waveforms of the first circuit unit and the second circuit unit shown in FIGS. 12 and 13.

FIG. 12 is a view showing a configuration of a first circuit unit shown in FIG. 11. FIG. 13 is a view showing a configuration of the second circuit unit shown in FIG. 11. FIG. 14 is a view showing input/output signal waveforms of the first circuit unit and the second circuit unit shown in FIGS. 12 and 13.

Referring to FIG. 12, the first circuit unit 241 may receive the start control signal GST and the node charge control signal LSP_in and output the reset signal RESET accordingly. In one embodiment, the first circuit unit 241 may be configured as a logic circuit to generate the reset signal RESET through a predetermined logical operation from the start control signal GST and the node charge control signal LSP_in. For example, the first circuit unit 241 may be formed of the logic gate AND.

The logic gate AND may be an AND gate. The logic gate AND receives an inverted signal of the node charge control signal LSP_in through a NAND gate with the start control signal GST. As shown in FIG. 14, the logic gate AND may output the reset signal RESET at the turn-on level, e.g., the logic high level when the input start control signal GST and the inverted signal of the input node charge control signal LSP_in are both at the turn-on levels, e.g., the logic high levels.

The reset signal RESET output from the first circuit unit 241 is transmitted to the second circuit unit 242. The second circuit unit 242 may output the output erase signal MUTE in response to the reset signal RESET.

Referring to FIG. 13, the second circuit unit 242 may receive the reset signal RESET and the start signal VSP from the first circuit unit 241 and output the clock shift stop signal CSP accordingly. In one embodiment, the second circuit unit 242 may be configured as a digital logic circuit to generate the clock shift stop signal CSP through a predetermined logical operation from the reset signal RESET and the start signal VSP.

The digital logic circuit may include a power input terminal D for receiving operation power, an input terminal for receiving the reset signal RESET, an initialization terminal RESET for receiving the start signal VSP, a Q node output terminal Q for outputting the signal at the logic high level, and a QB node output terminal QB for outputting the signal at the logic low level. As shown in FIG. 14, when the reset signal RESET input to the input terminal is switched from the logic high level to the logic low level, the digital logic circuit outputs the clock shift stop signal CSP at the logic high level through the Q node output terminal Q (e.g., outputs the clock shift stop signal CSP). In addition, when the start signal VSP input to the initialization terminal RESET is switched from the logic low level to the logic high level, the digital logic circuit outputs the clock shift stop signal CSP at the logic low level through the QB node output terminal CSP (e.g., does not output the clock shift stop signal CSP).

Figure 15:
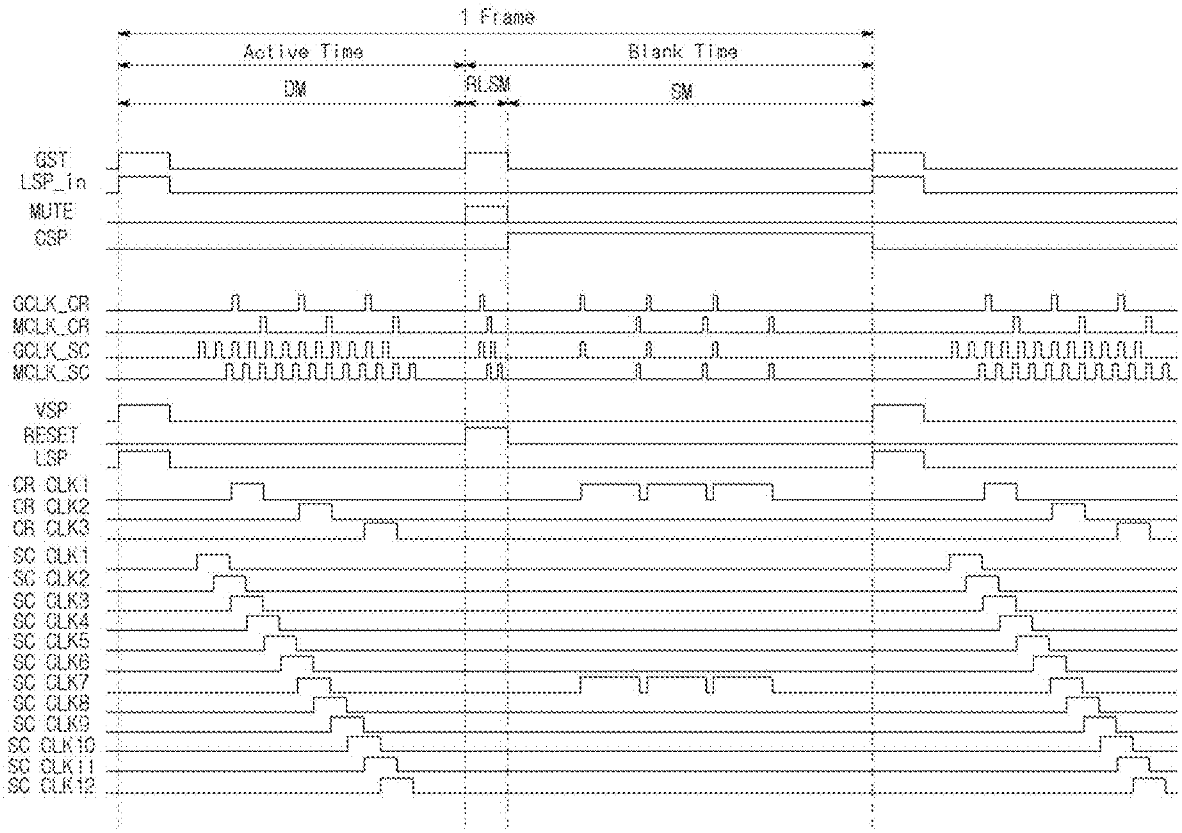
FIG. 15 is a timing diagram showing input/output signal waveforms of the timing controller, the level shifter, and the gate driver shown in FIG. 11.

FIG. 15 is a timing diagram showing input/output signal waveforms of the timing controller, the level shifter, and the gate driver shown in FIG. 11.

Referring to FIG. 15, one frame may include the active time and the blank time. For the active time, the display device 100 (see FIG. 1) may operate in the display mode DM in which images are displayed, and for the blank time, the display device 100 may operate in the sensing mode SM in which the characteristic values of the pixels P (see FIG. 1) are sensed. To select the pixel line to be sensed in the corresponding frame, the display device 100 may operate in the line selection mode RLSM before the sensing mode SM for the blank time.

Referring to FIG. 11 together, as the start control signal GST and the node charge control signal LSP_in are output at the turn-on levels from the timing controller 250 for the active time, the display device 100 may operate in the display mode DM. The level shifter 240 outputs the start signal VSP and the node charge signal LSP in response to the start control signal GST and the node charge control signal LSP_in at the turn-on levels. Then, the stage circuits ST1 to ST4 (see FIG. 5) of the gate driver 230 are pulled up by the start signal VSP and the node charge signal LSP to become states that may output the gate signal.

Thereafter, during the display mode DM, the timing controller 250 outputs the clock control signals GCLK_CR, MCLK_CR, GCLK_SC, and MCLK_SC corresponding to the display mode DM. The level shifter 240 sequentially generates and outputs the plurality of carry clock signals CR_CLK1 to CR_CLK3 that rise in synchronization with the rising edge of the first carry clock control signal GCLK_CR and fall in synchronization with the falling edge of the second carry clock control signal MCLK_CR. In addition, the level shifter 240 sequentially generates and outputs the plurality of gate clock signals SC_CLK1 to SC_CLK3 that rise in synchronization with the rising edge of the first gate clock control signal GCLK_SC and fall in synchronization with the falling edge of the second gate clock control signal MCLK_SC.

The stage circuits ST1 to ST4 in the pull-up state may sequentially output the carry signals based on the carry clock signals CR_CLK1 to CR_CLK3 output from the level shifter 240 and sequentially output the gate signals to the gate lines GL (see FIG. 1) of the display panel 110 (see FIG. 1) based on the gate clock signals SC_CLK1 to SC_CLK12.

For the blank time, as the start control signal GST is output at the turn-on level from the timing controller 250, the display device 100 may operate in the reset and line selection mode RLSM. The level shifter 240 outputs the reset signal RESET in response to the start control signal GST at the turn-on level. The gate driver 230 may be initialized to a pull-down state in response to the reset signal RESET.

In addition, the level shifter 240 may output the output erase signal MUTE in response to the reset signal RESET. While the output erase signal MUTE is generated, the level shifter 240 does not generate the carry clock signals CR_CLK1 to CR_CLK3 and the gate clock signals SC_CLK1 to SC_CLK12. Therefore, the gate signal is not output from the gate driver 230. Alternatively or additionally, the level shifter 240 may count pulses of the clock control signals GCLK_CR, MCLK_CR, GCLK_SC, and MCLK_SC applied from the timing controller 250.

For example, the level shifter 240 may acquire the first pulse counting number by counting the number of times of pulse generation of the first carry clock control signal GCLK_CR and/or the number of times of pulse generation of the second carry clock control signal MCLK_CR and acquire the second pulse counting number by counting the number of times of pulse generation of the first gate clock control signal GCLK_SC and/or the number of times of pulse generation of the second gate clock control signal MCLK_SC. In the shown embodiment, since the pulse of the first carry clock control signal GCLK_CR and the pulse of the second carry clock control signal MCLK_CR are each generated once, the first pulse counting number is (1, 1), and since the pulse of the first gate clock control signal GCLK_SC and the pulse of the second gate clock control signal MCLK_SC are each generated twice, the second pulse counting number is (2, 2).

Thereafter, when the start control signal GST is output at the turn-off level from the timing controller 250, the level shifter 240 may output the clock shift stop signal CSP at the turn-on level in response to the switching of the level of the start control signal GST. The display device 100 may operate in the sensing mode SM in response to the clock shift stop signal CSP.

The level shifter 240 may determine the phases of the carry clock signals CR_CLK1 to CR_CLK3 and the gate clock signals SC_CLK1 to SC_CLK12, which will be generated during the sensing mode SM, based on the pulse counting number acquired during the reset and line selection mode RLSM. For example, when the first pulse counting number is 1, during the sensing mode SM, the level shifter 240 may generate the second carry clock signal CR_CLK2 having the phase shifted by ⅓ cycle. In addition, when the first pulse counting number is (1, 1) and the second pulse counting number is (2, 2), during the sensing mode SM, the level shifter 240 may generate the seventh gate clock signal SC_CLK7 having the phase shifted by $7/12$ cycle.

In one embodiment, the first pulse counting number and the corresponding carry clock signals CR_CLK1 to CR_CLK3 may be the same as those defined in Table 1. In addition, the carry clock signals CR_CLK1 to CR_CLK3 determined corresponding to the first pulse counting number, the second pulse counting number, and the corresponding gate clock signals SC_CLK1 to SC_CLK12 may be the same as those defined in Table 2. However, the combinations of the pulse counting numbers and the corresponding clock signals CR_CLK1 to CR_CLK3, SC_CLK1 to SC_CLK12 are not limited thereto.

During the sensing mode SM, the level shifter 240 may generate and output the selected carry clock signals CR_CLK1 to CR_CLK3 and gate clock signals SC_CLK1 to SC_CLK12 in synchronization with the rising edges and falling edges of the clock control signals GCLK_CR, MCLK_CR, GCLK_SC, and MCLK_SC provided from the timing controller 250.

The stage circuits ST1 to ST4 of the gate driver 230 may output the carry signals based on the carry clock signals CR_CLK1 to CR_CLK3 output from the level shifter 240 and output the gate signals to the corresponding gate lines based on the gate clock signals SC_CLK1 to SC_CLK12. Since one carry clock signal CR_CLK1 and one gate clock signal SC_CLK2 are provided during the sensing mode SM, the gate signal may be selectively output from the corresponding one of the stage circuits ST1 to ST4. Therefore, sensing may be performed on one (or more) pixel lines selected during line selection mode LSM.

Thereafter, as the start control signal GST and the node charge control signal LSP_in are output at the turn-on levels from the timing controller 250 for the active time, the display device 100 may re-operate in the display mode DM. The level shifter 240 outputs the start signal VSP and the node charge signal LSP in response to the start control signal GST and the node charge control signal LSP_in at the turn-on levels. Then, the stage circuits ST1 to ST4 (see FIG. 5) of the gate driver 230 are pulled up by the start signal VSP and the node charge signal LSP to become states that may output the gate signal.

In addition, the level shifter 240 may output the clock shift stop signal CSP at the turn-off level (e.g., does not output the clock shift stop signal CSP) in response to the start signal VSP being switched to the turn-on level. Therefore, the sensing mode SM ends, and the display device 100 may stably start the display mode DM.

In the shown embodiment, during the blank time, the display device 100 performs the sensing line selection in response to the output erase signal MUTE while the gate driver 230 is reset in response to the reset signal RESET. In other words, the display device 100 may simultaneously (in parallel) perform the reset of the gate driving 230 and the sensing line selection. Therefore, the delay time from the sensing line selection to the sensing mode SM can be reduced, and the period of the sensing mode SM within the blank time can be increased, thereby securing the time sufficient for pixel sensing and compensation.

In addition, in the shown embodiment, the display device 100 does not require the clock shift stop control signal CSP_in (see FIG. 7) applied from the timing controller 250 to the level shifter 240. Therefore, it is possible to reduce the structural complexity of the timing controller 250 and the level shifter 240 and reduce the manufacturing cost and time.

According to the level shifter, the display device including the same, and the method of driving the display device according to the embodiments, it is possible to secure the sufficient time required for pixel sensing by increasing the sensing period for the blank time.

According to the level shifter, the display device including the same, and the method of driving the display device according to the embodiments, it is possible to secure the sufficient pixel sensing time and compensation time in the blank time by eliminating the time delay between the selection of the pixel line to be sensed and the pixel sensing.

According to the level shifter, the display device including the same, and the method of driving the display device according to the embodiments, it is possible to achieve the lighter and thinner device and simplify the structure by reducing the number of control signals for controlling the level shifter and the number of terminals.

Although the embodiments of the present disclosure have been described above with reference to the accompanying drawings, those skilled in the art to which the present disclosure pertains will be able to understand that the above-described technical configuration of the present disclosure can be carried out in other specific forms without changing the technical spirit or features thereof. Therefore, it should be understood that the above-described embodiments are illustrative and not restrictive in all respects. In addition, the scope of the present disclosure includes those described in the claims, those described in the detailed description, and those illustrated in the drawings. In addition, the meaning and scope of the claims and all changed or modified forms derived from the equivalent concept should be construed as being included in the scope of the present disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A level shifter, comprising:

a first circuit unit configured to output one or more of a start signal, a reset signal, or a node charge signal to a gate driver in response to one or more of a start control signal or a node charge control signal received from a timing controller;

a second circuit unit configured to output one or more of an output erase signal or a clock shift stop signal in response to one or more of the start signal or the reset signal; and a third circuit unit configured to, in response to the output erase signal, initiate counting a number of pulses of a clock control signal received from the timing controller while the reset signal output on turn-on level, generate and output a clock signal having a phase corresponding to a pixel line selected based on the counted number of the pulses of the clock control signal to the gate driver.

2. The level shifter of claim 1, wherein the first circuit unit is configured to output the start signal and the node charge signal at turn-on levels in response to receiving the start control signal and the node charge control signal at turn-on levels, and is configured to output the reset signal at a turn-on level in response to receiving the start control signal at the turn-on level without the node charge control signal.

3. The level shifter of claim 1, wherein the first circuit unit includes a logic gate, which is connected to receive the start control signal and an inverted signal of the node charge control signal and is configured to output the reset signal at the turn-on level in response to the start control signal and the inverted signal of the node charge control signal are both at turn-on levels.

4. The level shifter of claim 1, wherein the second circuit unit is configured to output the clock shift stop signal to rise in synchronization with a falling edge of the reset signal and to fall in synchronization with a rising edge of the start signal.

5. The level shifter of claim 1, wherein the second circuit unit includes a digital logic gate, and is configured to output the clock shift stop signal at a turn-on level in response to receiving the reset signal at a turn-on level and to output the clock shift stop signal at a turn-off level in response to receiving the start signal at a turn-on level.

6. The level shifter of claim 1, wherein the third circuit unit is configured to stop an output of the clock signal in response to receiving the output erase signal at a turn-on level, generate the clock signal having the phase corresponding to the selected pixel line in response to receiving the clock shift stop signal at a turn-on level, and output the clock signal to the gate driver.

7. A display device, comprising:

a display panel on which pixels are disposed;

a gate driver configured to provide a gate signal to the pixels;

a timing controller configured to control an operating timing of the gate driver; and a level shifter configured to provide a clock signal to the gate driver based on a clock control signal input from the timing controller, wherein in operation, when the level shifter outputs a reset signal at a turn-on level to the gate driver during a blank time within a frame, the timing controller applies the clock control signal to the level shifter, wherein, when the reset signal transitions to a turn-off level, the gate driver provides a gate signal to a pixel line selected based on a number of pulses of the clock control signal to sense characteristics of pixels on the selected pixel line.

8. The display device of claim 7, wherein the level shifter is configured to apply the reset signal at a turn-on level to the gate driver to initialize the gate driver.

9. The display device of claim 7, wherein, while the reset signal at the turn-on level is output, the pixel line of which characteristic values are sensed is selected based on the clock control signal.

10. The display device of claim 9, wherein, while the level shifter outputs the reset signal at a turn-off level for the blank time, the gate driver provides the gate signal to the selected pixel line based on the clock signal provided from the level shifter.

11. The display device of claim 7, wherein the level shifter includes:

a first circuit unit configured to output one or more of a start signal, the reset signal, or a node charge signal to the gate driver in response to one or more of a start control signal or a node charge control signal that are input from the timing controller;

a second circuit unit configured to output one or more of an output erase signal or a clock shift stop signal in response to the one or more of the start signal or the reset signal; and a third circuit unit configured to generate the clock signal based on the clock control signal input from the timing controller and output the generated clock signal to the gate driver in response to the one or more of the output erase signal or the clock shift stop signal that are output from the second circuit unit.

12. The display device of claim 11, wherein the first circuit unit is configured to output the start signal and the node charge signal at turn-on levels in response to receiving the start control signal and the node charge control signal at turn-on levels, and is configured to output the reset signal at a turn-on level in response to receiving the start control signal at the turn-on level without the node charge control signal.

13. The display device of claim 11, wherein the second circuit unit is configured to output the output erase signal at a turn-on level in response to the reset signal at a turn-on level output from the first circuit unit.

14. The display device of claim 11, wherein the second circuit unit is configured to output the clock shift stop signal to rise in synchronization with a falling edge of the reset signal and to fall in synchronization with a rising edge of the start signal.

15. The display device of claim 11, wherein the second circuit unit is configured to obtain a pulse counting number from the clock control signal received from the timing controller in response to receiving the reset signal at a turn-on level and to select the pixel line to be sensed based on the pulse counting number.

16. The display device of claim 15, wherein the third circuit unit is configured to stop an output of the clock signal in response to receiving the output erase signal at a turn-on level, generate the clock signal having a phase corresponding to the selected pixel line in response to receiving the clock shift stop signal at a turn-on level, and output the clock signal to the gate driver.

17. A method of driving a display device including a gate driver configured to provide a gate signal to pixels, a timing controller configured to control an operation of the gate driver, and a level shifter configured to provide a clock signal to the gate driver based on a clock control signal input from the timing controller, the method comprising:

a reset and line selection operation of initializing the gate driver in response to a reset signal provided from the level shifter to the gate driver and selecting a pixel line to be sensed based on a number of pulses of the clock control signal applied to the level shifter from the timing controller for a blank time within a frame; and a sensing operation of applying, by the gate driver, the gate signal to the selected pixel line to sense characteristics of pixels on the selected pixel line based on the clock signal provided from the level shifter to the gate driver, in response to the reset signal transitioning to a turn-off level.

18. The method of claim 17, wherein the reset and line selection operation includes:

applying, by the timing controller, a start control signal at a turn-on level to the level shifter;

outputting, by the level shifter, a reset signal at a turn-on level to the gate driver in response to the start control signal;

outputting, by the timing controller, the clock control signal to the level shifter while the reset signal is output by the level shifter at the turn-on level;

counting, by the level shifter, the clock control signal; and selecting the pixel line to be sensed based on the counting.

* * * * *